(12) United States Patent
Jones

(10) Patent No.: US 8,931,189 B2
(45) Date of Patent: Jan. 13, 2015

(54) APPARATUS AND METHOD FOR MATERIAL DISTRIBUTION

(76) Inventor: David A. Jones, Rio Rancho, NM (US)

( * ) Notice: Subject to any disclaimer, the term of this patent is extended or adjusted under 35 U.S.C. 154(b) by 0 days.

(21) Appl. No.: 13/471,722

(22) Filed: May 15, 2012

(65) Prior Publication Data

US 2012/0291319 A1 Nov. 22, 2012

Related U.S. Application Data

(60) Provisional application No. 61/519,260, filed on May 19, 2011.

(51) Int. Cl.
| | |
|---|---|
| *E02F 3/76* | (2006.01) |
| *E02F 3/96* | (2006.01) |
| *E02F 3/28* | (2006.01) |
| *E02F 3/407* | (2006.01) |
| *E02F 3/46* | (2006.01) |
| *E02F 3/56* | (2006.01) |
| *E02F 9/18* | (2006.01) |
| *E02F 9/20* | (2006.01) |
| *E01H 5/06* | (2006.01) |

(52) U.S. Cl.
CPC ............... *E02F 3/962* (2013.01); *E02F 3/4075* (2013.01); *E02F 3/46* (2013.01); *E02F 3/56* (2013.01); *E02F 3/769* (2013.01); *E02F 3/961* (2013.01); *E02F 9/18* (2013.01); *E02F 9/202* (2013.01); *E01H 5/061* (2013.01); *B62B 2301/12* (2013.01)
USPC .............................................. 37/410; 37/442

(58) Field of Classification Search
USPC ................. 172/13, 21, 22, 29, 777, 781, 133, 172/256–258, 810, 811, 297, 310, 329, 332, 172/346, 431, 433, 684.5, 701.1; 37/301, 37/196, 241, 403, 407–412, 417, 419, 431, 37/442
See application file for complete search history.

(56) References Cited

U.S. PATENT DOCUMENTS

| | | | | |
|---|---|---|---|---|
| 307,530 | A * | 11/1884 | Eckerson | 37/437 |
| 872,439 | A * | 12/1907 | Livengood | 37/446 |
| 1,489,114 | A * | 4/1924 | Butler | 37/412 |
| 2,312,390 | A * | 3/1943 | Cordes | 37/410 |
| 2,339,518 | A * | 1/1944 | Reisser | 37/410 |
| 2,508,284 | A * | 5/1950 | Oliver | 37/301 |
| 2,660,816 | A * | 12/1953 | Maxwell | 37/410 |
| 2,932,103 | A * | 4/1960 | Wright | 37/434 |
| 3,021,625 | A * | 2/1962 | Stasse | 37/434 |
| 3,235,985 | A * | 2/1966 | Lauster | 37/411 |
| 3,463,243 | A * | 8/1969 | Fisher | 172/781 |
| 4,041,624 | A * | 8/1977 | Fryrear | 37/404 |
| 4,798,011 | A * | 1/1989 | Sprinkle | 37/408 |

(Continued)

*Primary Examiner* — Thomas B Will
*Assistant Examiner* — Joan D Misa
(74) *Attorney, Agent, or Firm* — Jennifer S. Stachniak; Robert W. Becker

(57) ABSTRACT

Apparatus and method for material distribution, including a drawbar to which is fixedly connected a bucket body. Wheels are attached to the drawbar on opposite sides of the bucket body between an open side and a gate thereof. A lower edge of the open side of the bucket body, which can receive material, is in the form of a cutting blade or teeth. The gate, which is disposed opposite from the open side, can be opened and closed. At least part of a top side of the bucket body forms a platform for an operator. At least one engine is provided and is drivingly connected to the wheels. A handlebar is connected to the bucket body, forward of the platform, for pivoting the bucket body about the wheels so that the cutting blade or teeth can be brought into or out of contact with a surface.

14 Claims, 18 Drawing Sheets

(56) References Cited

U.S. PATENT DOCUMENTS

| | | | |
|---|---|---|---|
| 5,456,028 A * | 10/1995 | Larson | 37/404 |
| 6,371,228 B1 * | 4/2002 | Husted et al. | 180/65.1 |
| 6,715,579 B1 * | 4/2004 | Hendron | 280/764.1 |
| 6,775,933 B2 * | 8/2004 | Koch et al. | 37/231 |
| 6,907,949 B1 * | 6/2005 | Wang | 180/65.51 |
| 6,941,685 B2 * | 9/2005 | Goy et al. | 37/232 |
| 7,318,595 B2 * | 1/2008 | Lamela et al. | 280/124.157 |
| 7,703,568 B2 * | 4/2010 | Ishii | 180/218 |
| 8,091,672 B2 * | 1/2012 | Gutsch et al. | 180/218 |
| 2010/0326680 A1 * | 12/2010 | Sundhagen et al. | 172/329 |

* cited by examiner

APPARATUS AND METHOD FOR MATERIAL DISTRIBUTION

The present invention claims priority from U.S. Provisional Patent Application No. 61/519,260, filed May 19, 2011 and entitled "Apparatus and Method for Improved Material Distribution".

BACKGROUND OF THE INVENTION

The present invention relates to a compact and lightweight material moving apparatus and method of loading and moving material when performing construction, excavation, grading, landscaping, and other tasks.

Various types of grading or material moving devices have been in existence for many years, for example historic horse-drawn blades to current large models for interstate highway construction. Disadvantages of machines currently known in the art include elevated cost, poor transportability, poor ability to work in confined areas, and width of gradable area being wider than desired. Machines currently used also use unacceptably elevated amounts of fuel and oil, and are not considered environmentally friendly.

Further, power-assist devices have been in existence for decades. These machines are found in a variety of sizes and take many forms depending upon the tasks for which the machines are designed. Typically, the power-assist machines include a plurality of pneumatic support wheels, a cab or seat, and foot pedals for use by the operator of the device. These machines are most commonly equipped with a bucket or skid with which material may be moved. Some of the machines may be provided with one or more attachments, which may increase the utility of such devices.

While the machines currently known have great utility, they also have significant drawbacks. One drawback is that these machines are relatively heavy, use elevated amounts of fuel, and are less maneuverable. The small support wheels, usually having pneumatic tires, have a large ground contact pressure and tend to become mired in soft ground or in muddy conditions. A popular attachment for such machines are pairs of endless tracks that are configured to be connected to the tires on the wheels. These tracks are an added expense, as well as being cumbersome, heavy and difficult to install. Additionally, attachment and removal of the tracks requires that the machine be taken out of service for a variable amount of time. The tracks also can become dislodged and disengaged due to misalignment, underinflation of the pneumatic tires, insufficient tensioning of the tracks, stretching of the track due to wear and tear, and the like.

Another drawback of machines used presently is that auxiliary counterweights, related to a size limitation, must be used. Some of the prior art machines use auxiliary counterweights to increase the rated load carrying capacity. However, the weights are usually attached only on the rear of a machine and serve only to increase the lifting capacity of the machine. Typically, only a bucket or other lightweight accessory is originally attached to the machine and more counterweight is needed to counterbalance the lifting requirement. There is currently no provision for counterbalancing accessories attached to currently-used machines that require the front ends of lift arms to provide a competing or downward pushing force.

Skid-steer loaders, where "skid-steer" refers to a loader's steering, are well known in the construction industry, and are versatile, powerful machines used extensively for material handling purposes. Skid-steer loaders use four hydrostatically driven wheels and allow the machine to turn within its own wheel base by breaking or counter-rotating each side, similar to a military tank track controlling mechanism.

Different types of light-duty, skid steer loaders called mini-loaders are also currently known in the industry. These machines are significantly smaller than typical construction skid-steer loaders but may not be correspondingly less expensive. Attachments for these mini-loaders are also available for landscaping, ground maintenance, turf building, light industrial uses, small contracting industries, and small farming industries. These machines are a scaled-down version of a skid-steer device designed to work in confined construction areas. The mini-skid-steer devices or mini-loaders currently used accommodate the small contractor and rental market. These light-duty, skid-steer loaders are still too large and expensive for personal home use, storage, or easy transportation. Additionally, the skid-steer wheel control acts in general like a tank track, i.e. one side is locked up, or skidded, while the others continue to rotate. This type of steering control tends to tear up the turf or ground on which the skid-steer vehicle is operating, making such vehicles impracticable for personal home use in a garden, lawn or anywhere that the surface or ground should remain relatively undisturbed. Additionally, skid-steer drive and steering systems are expensive to service and repair must be performed by skilled experts.

Garden tractors are also well known in the art and can be designed for use with a front blade for light dozing work (for instance, with snow and/or a snow thrower for the same purpose). Larger garden tractors have substantial horsepower and sturdy frames that can accommodate ground-engaging attachments such as tillers, dozer blades, small backhoes, and other useful accessories. While garden tractors offer substantial abilities to mow and do light garden work, they do not have any vertical lifting capability and are not useful as a loader or a digger and have poor ground clearance, large turning radiuses, and cumbersome attachment methods.

Self-balancing motorized human transporters are also known in the art. These machines use gyroscopes attached to sensors in order to determine pitch. Segway® transporters, for example, use a special solid-state angular rate sensor. Segway® transporters do have disadvantages because they are very expensive and are not designed for material movement attachments. Thus, they are currently used only for personal transport.

SUMMARY OF THE INVENTION

The following summary of various aspects of the invention is provided to facilitate an understanding of some of the innovative features unique to the present invention, and is not intended to be a full description of variations that may be apparent to those of skill in the art. A full appreciation of the various aspects of the invention can be gained from the entire specification, claims, drawings, and abstract taken as a whole.

The present invention relates to a material moving apparatus comprising a compact self-propelled vehicle for performing construction and landscape tasks. The material moving apparatus is controlled by an operator walking or alternately riding atop the apparatus. The material moving apparatus pushes, lifts, moves, loads or unloads, in both horizontal and vertical directions, material(s) as required. For example, snow, dirt, rock, gravel or other landscape and construction materials may be handled, controlled or otherwise maneuvered through confined work spaces. The material moving apparatus is extremely maneuverable and nimble when transporting material in confined spaces. A variety of attachment accessories (such as, for example, dozer blades, sweepers, rakes, buckets, grappels, and pallet forks) are removably insertable with the material moving apparatus. Various ground engagement attachments may also be removably insertable with the front or rear of the machine (including but not limited to tillers, plows, brooms, rakes, and harrows). These attachments attach easily to the frame or drawbar of the present invention. The attachments may be used during either the mountable or walk behind positions, with the main interchangeable accessory for most requirements being the moldboard blade that attaches at the end of the drawbar extension.

The present invention relates to a compact, preferably lightweight grading apparatus guidable by an operator who stands on an operator platform in one embodiment, or walks behind the machine in another embodiment. The present invention may be particularly useful by operators working in relatively hostile outdoor environments, such as partially submerged or underwater conditions, firefighting uses, industrial uses, extreme cold, or at home uses. The present invention, by using minimal amounts of fuel and oil, is also, in one embodiment, a "green" apparatus.

The present invention is easily transported via an automobile or vehicle without needing any type of trailer, as it may be carried on a receiver hitch attached to the automobile's or vehicle's bumper. The cost of the present invention comprising a material moving apparatus is envisioned to be approximately 7 to 10% of the cost of an automobile in comparison to much more for currently used grading machines. The present invention alternately is preferably shipped in two parcels, thus making the apparatus easily available worldwide.

The present invention is particularly deployable in confined areas, and narrow width areas. The present invention is employed in many situations that current machines cannot be used, such as situations in the forestry industry where landscape disturbance is minimized as much as possible despite heavy or rough topography.

The advantages of the present invention comprising a material moving apparatus include its small size, it is easily shipped, it is less expensive than other devices that perform the same functions, and it is energy efficient. The present invention is preferably classified in one embodiment as being "green" because it requires a minimal amount of oil to operate. For example, the present invention, in one embodiment, uses approximately 3.5 gallons of gasoline to excavate, place, and finish grade approximately 35 cubic yards of material, compared to devices in the prior art that require triple this amount of fuel to perform the same task. The transmission of the present invention uses one pint of oil to operate compared to approximately seven gallons of oil used in a hydrostatically driven machine of comparable capacity.

Another reason that the present invention is environmentally friendly is because when it is used for fighting fires, especially forest fires, it is an improvement over available devices known in the art because it is lightweight, small in size, and inexpensive. The present invention may be dropped by parachute into remote areas that are inaccessible by road using small planes that are currently used by smoke jumpers. The present invention may be used to cut fire lines, the currently most common method of fighting forest fires and fighting grass fires. Firefighting units are able to transport multiple units of the present invention via a small pickup truck. Fires contribute a significant amount of carbon dioxide ($CO_2$) to the atmosphere, so the rapid suppression of forest or grass fires, as provided by the method of using the present invention, greatly reduces the rate of $CO_2$ introduced into the atmosphere.

The novel features of the present invention will become apparent to those of skill in the art upon examination of the following detailed description of the preferred embodiment or can be learned by practice of the present invention. It should be understood, however, that the detailed description of preferred embodiments and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The accompanying drawings in the attachment, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 1b is a general plan right side view of the apparatus illustrated in FIG. 1a;

FIG. 1e is a front view of the apparatus illustrated in FIG. 1a;

FIG. 1f is a rear view of the apparatus illustrated in FIG. 1a;

FIG. 1g illustrates a top view of the apparatus illustrated in FIG. 1a;

FIG. 2b is a top view of the apparatus illustrated in FIG. 2a;

FIG. 2c is a front view of the apparatus illustrated in FIG. 2a;

FIG. 2d is a rear view of the apparatus illustrated in FIG. 2a;

FIG. 3b is a front view of the apparatus illustrated in FIG. 3a; and

FIG. 3c is a top view of the apparatus illustrated in FIG. 3a.

Additional aspects of the present invention will become evident upon reviewing the non limiting embodiments described in the specification and the claims taken in conjunction with the accompanying figures, wherein like reference numerals denote like elements.

Upon review of the present disclosure, those of skill in the art will realize that the present invention may be embodied as a system, kit, assembly, process or apparatus. Other variations and modifications of the present invention will be apparent to those of ordinary skill in the art, and is not limited except by the appended claims. The particular designs and configurations discussed herein can be varied, and are cited to illustrate particular embodiments of the present invention. It is contemplated that the use of the present invention can involve components having different characteristics as long as the principles disclosed herein are followed.

DETAILED DESCRIPTION OF THE INVENTION

The present invention is directed to a presently preferably non-hydraulic apparatus for moving material comprising an ultra compact, lightweight grading tractor driven by at least one engine or motor coupled with at least one drive unit which allows the device to turn quickly within its own wheel base by independently driven traction systems disposed laterally along the sides of the apparatus and methods of operating the apparatus and moving material. It should be noted that hydrostatically driven units, with or without hydraulically operated components, are also conceivable pursuant to the present invention.

Embodiments of the apparatus include a first embodiment comprising a single engine drive system with no independently operated traction system, or alternatively, a second embodiment comprising a single engine drive system with an independently operated traction system, or alternatively, a third embodiment comprising a dual engine drive system.

Figure 1A:
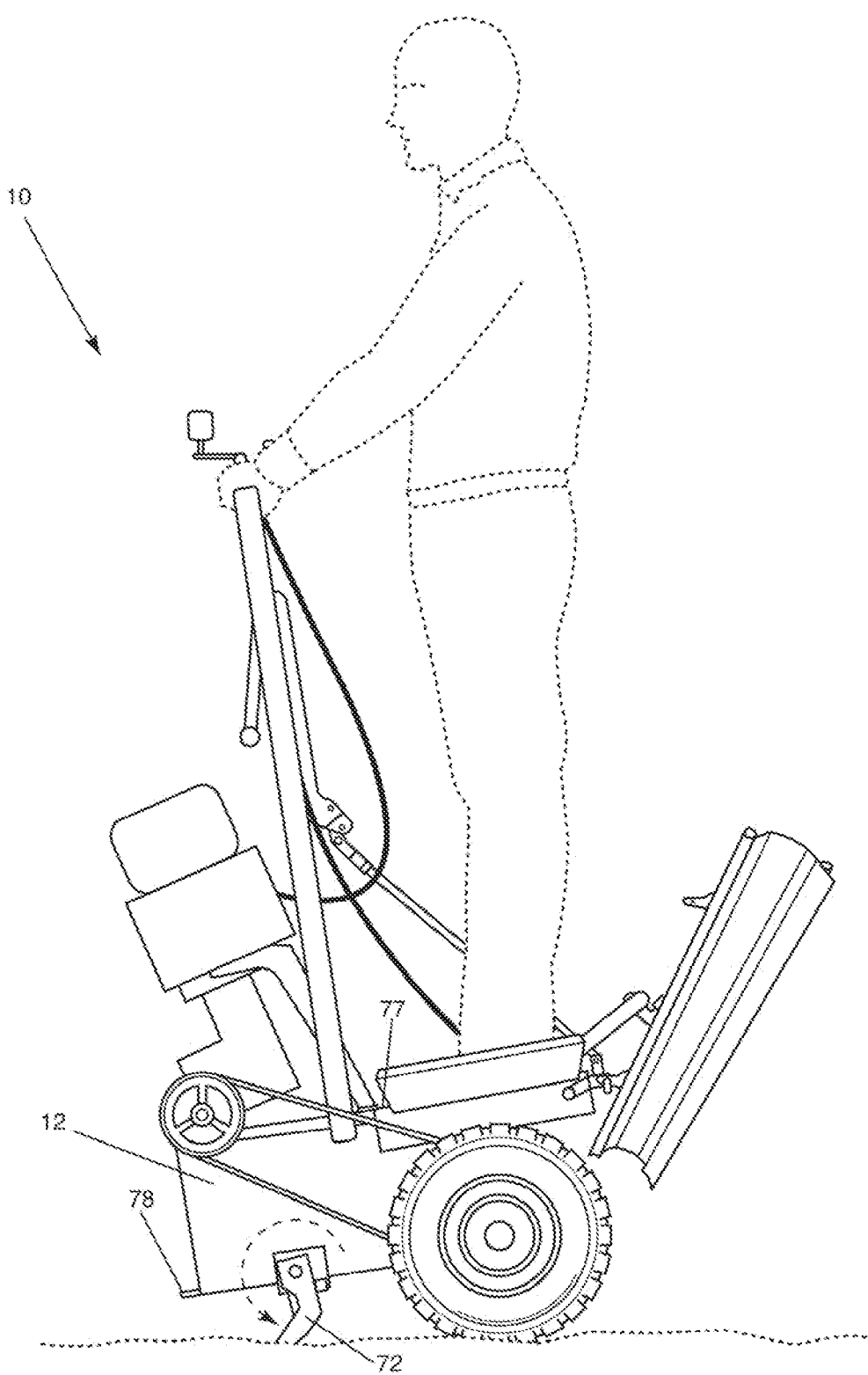
FIG. 1a illustrates a general left side view of one embodiment of the present invention, the illustration showing an operator atop an operator platform operating the apparatus in an upright position.
Figure 1B:
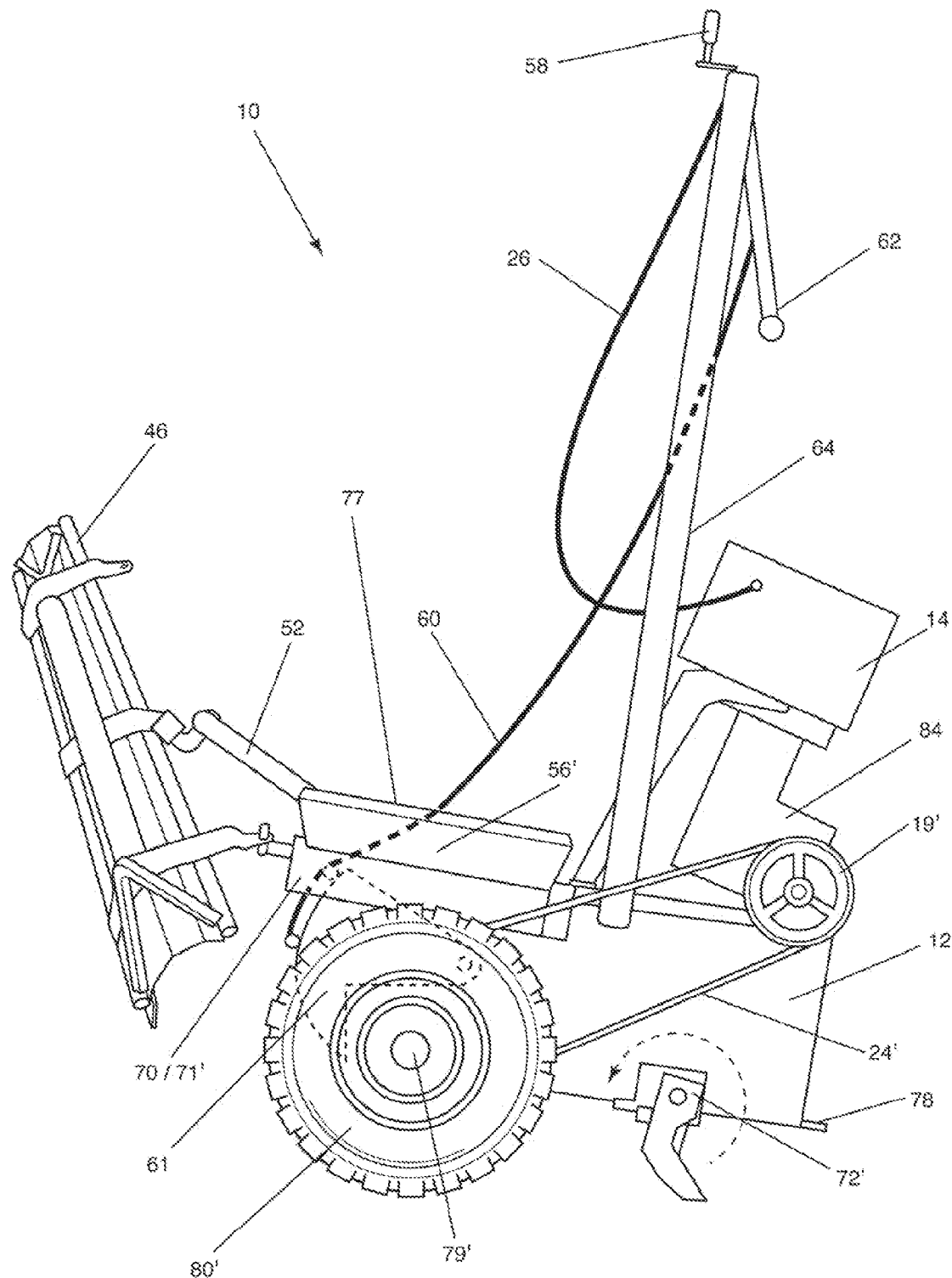
Figure 1C:
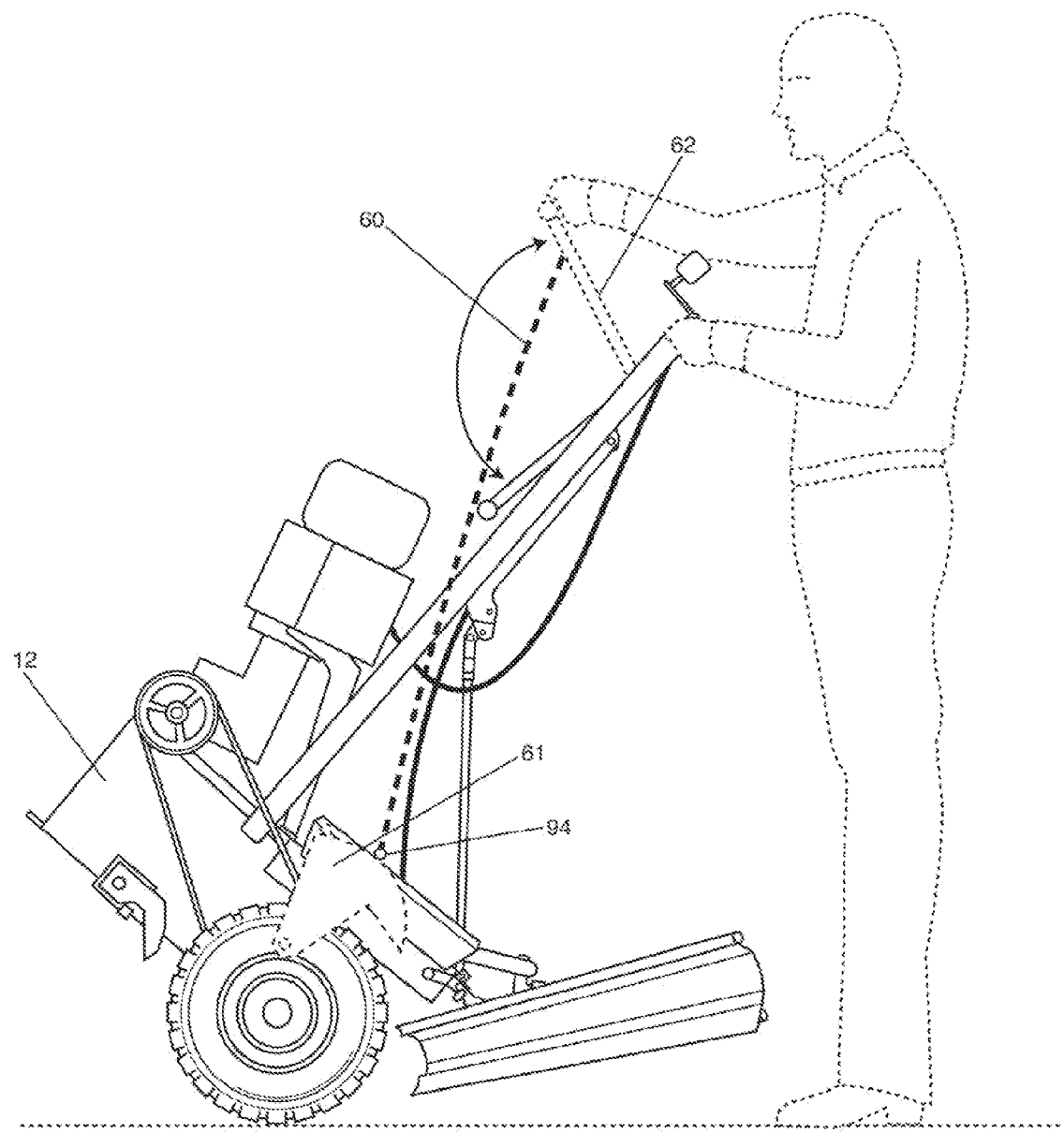
FIG. 1c illustrates a general left side view of one embodiment of the present invention, the illustration showing an operator's ability to engage, in either an open or closed clamshell position, a clamshell cable (illustrated in dark dashed lines) connected to a rotatable clamshell body (illustrated by lighter dashed lines)

FIG. 1a illustrates the general concept behind one of the embodiments of the present invention, with the ripper 72 in a down position, preparing the ground for scraping, scarifying and/or excavation. In this embodiment, Operator is standing on an operator platform 77 above the bucket body 12. Excavations are carried out with the operator standing in the same position but with ripper 72 rotated back out of the way (see for example FIGS. 3a and 3b), allowing the bucket or cutting blade 78 to make contact with the ground, which would allow cutting or stripping of ground with bucket blade 78, and excavated material to flow into the bucket. Of course, as identified throughout this specification and as seen in FIG. 1h, an operator may also operate the apparatus 10 by walking behind the apparatus 10. Preferable other embodiments of the apparatus of the present invention comprise an excavating bucket, a ripper, and a grading moldboard blade. The first two embodiments are engaged while the apparatus is in the mountable position, and the third embodiment is engaged while in the walk behind position.

Because of the tremendous flexibility in the design of the present invention, it contains many mechanical components which are variably used to transform the present invention into a versatile material moving apparatus. In order to understand the very basic features of the present invention, FIG. 1b is provided. As seen, the apparatus, which is designated generally by the reference numeral 10, has a bucket or bucket body 12 and an adjacent drawbar 70, together defining a support structure, the support structure supporting a handlebar 64, at least one engine 14, at least one drive system 18, 18', 19, 19', 24, 24' (see e.g. FIGS. 1d and 1e), at least one controllable transmission 84 and at least one rotatable drive means 79, 79', 80, 80', each transmission 84 adapted to power each drive system 18, 18', 19, 19', 24, 24' and each rotatable drive means 79, 79', 80, 80' by means of a throttle control 58 disposed on the material moving apparatus, especially on the handlebar 64. The bucket 12 further has a cutting blade 78 (which could also be in the form of teeth) on a bottom leading edge of the bucket 12, the bucket 12 also having a rotatable clamshell body or gate 61 pivotable about the rear of the bucket 12, the gate 61 being operable by a clamshell release mechanism 59 attached to the material moving apparatus 10 (see FIG. 1f). The support structure is also removably connectable to one or more ground engagement attachments (such as the moldboard blade shown in FIG. 1b, for example), which may be adjusted vertically and/or horizontally with respect to the ground plane and the apparatus' axles 79, 79', depending upon its required use. In one embodiment, the support structure may support one or more optional counterweights 56, 56' for those applications which require that the apparatus 10 needs more balance, needs additional weight over the drive system, or needs additional weight over the ground attachment means. Those of skill in the art will realize that a representative drive system may include various drives systems, including (but not limited to) an electric drive system, a battery operated drive system, a solar drive system and a gas-powered drive system.

Figure 1D:
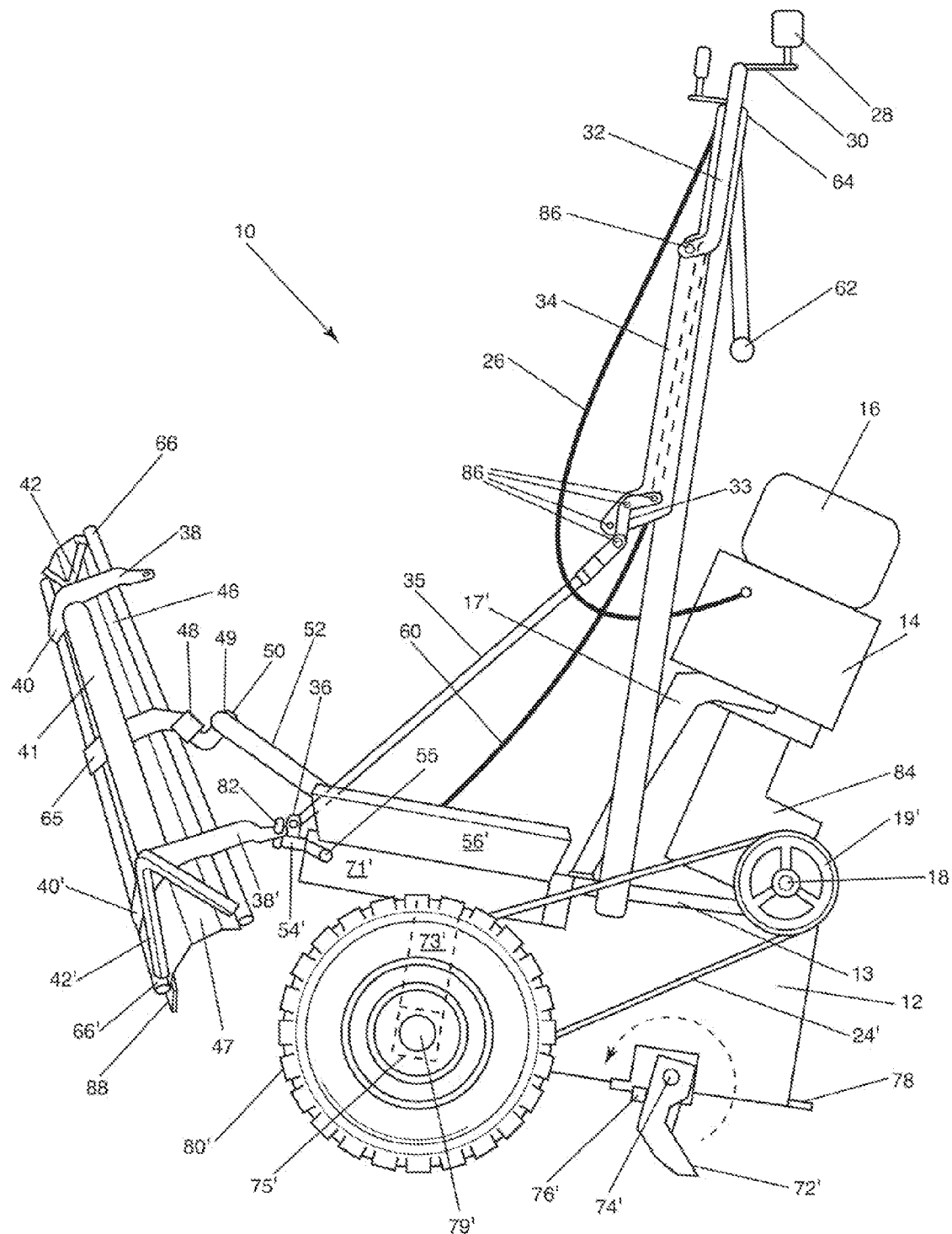
FIG. 1d is a more detailed view of the apparatus illustrated in FIG. 1b.
Figure 1E:
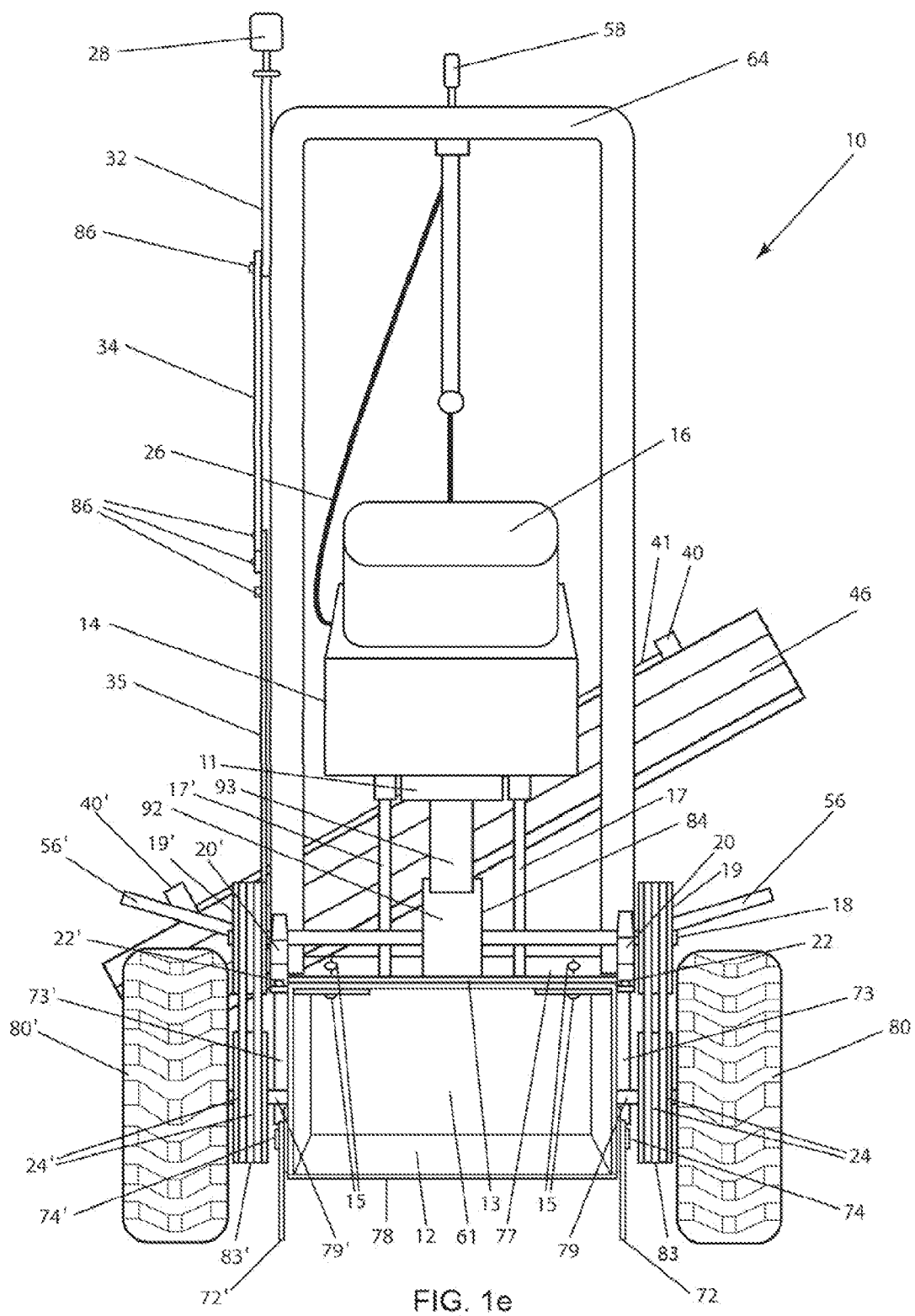
Figure 1F:
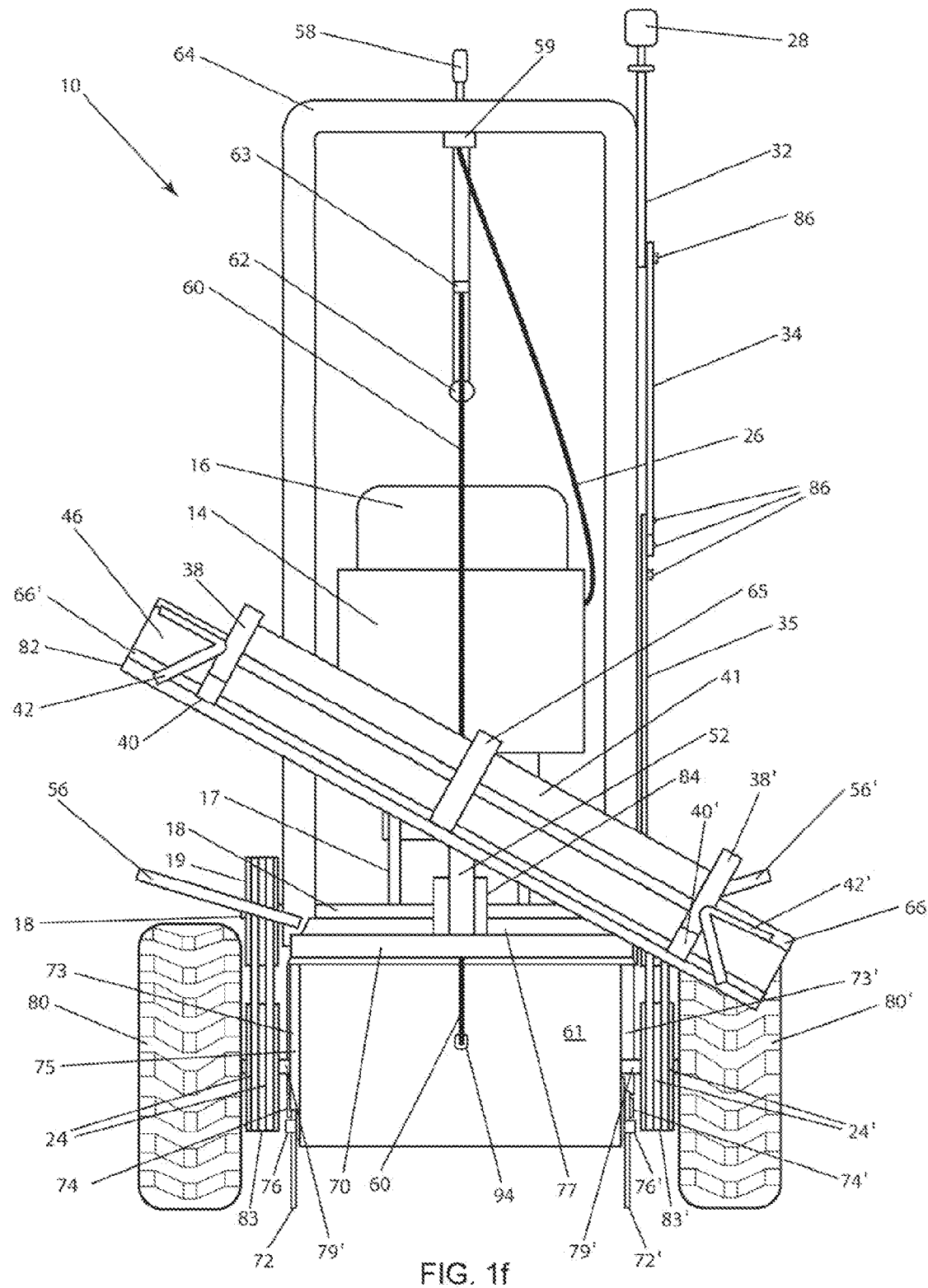
Figure 1G:
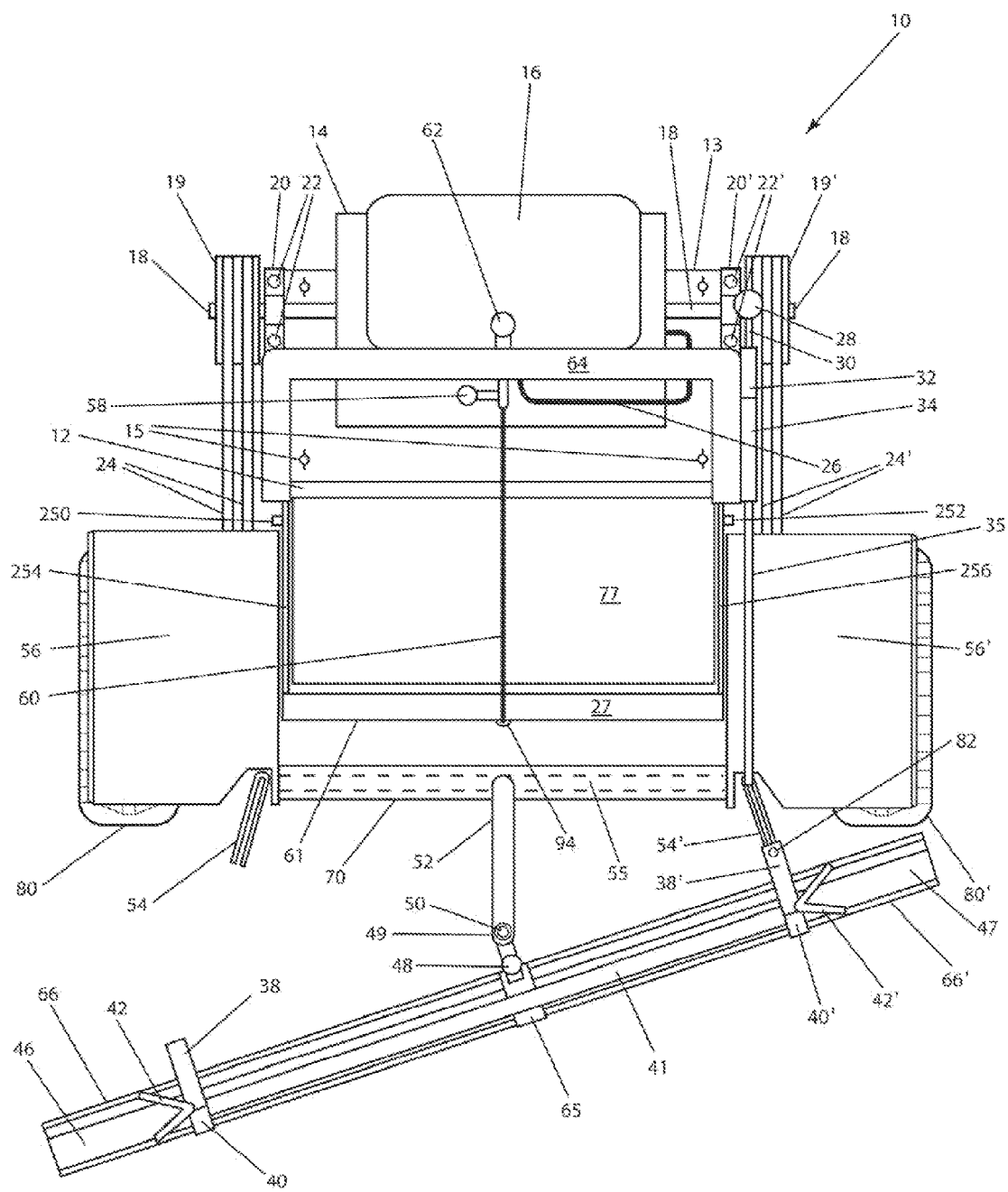
Figure 1H:
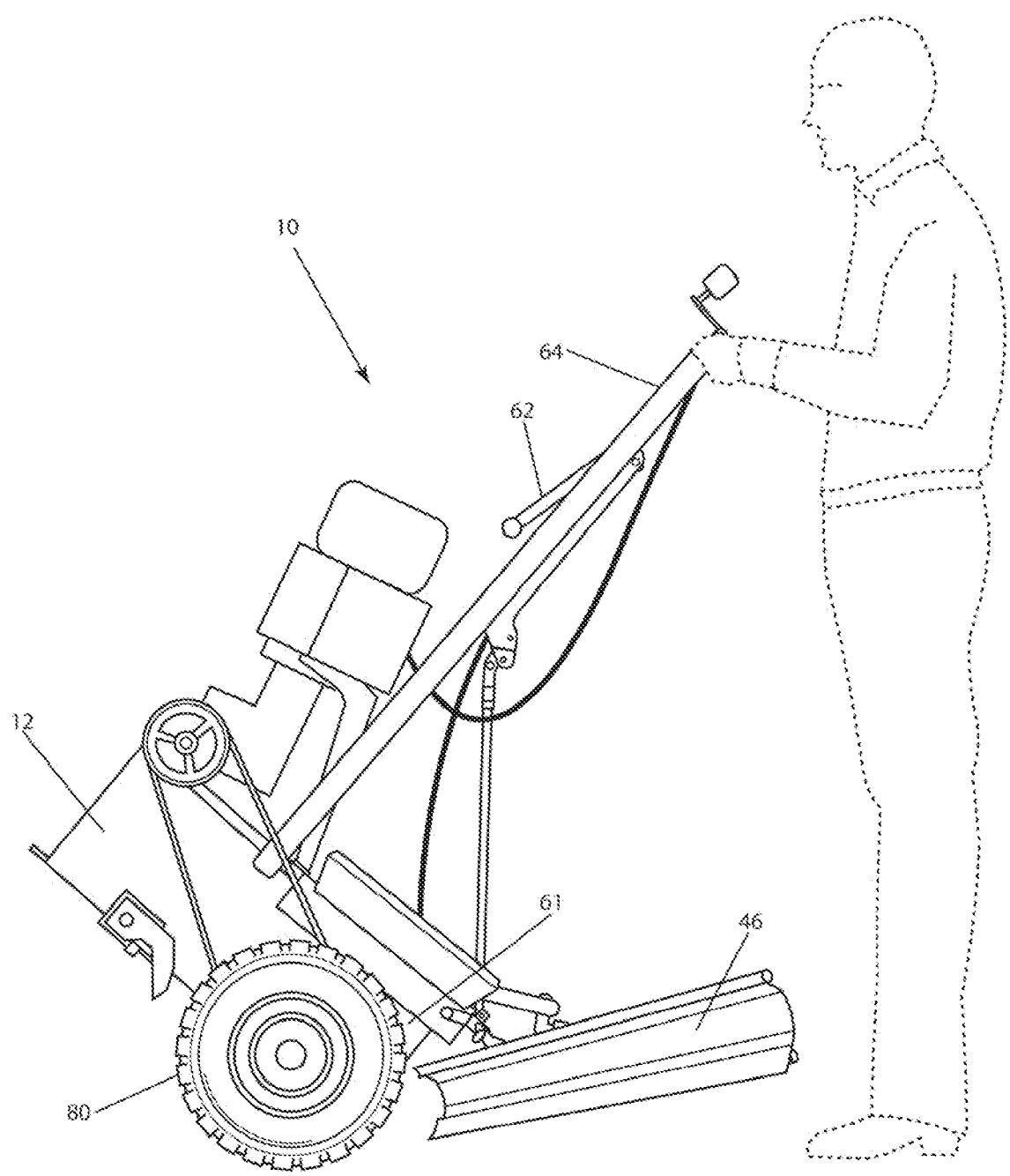
FIG. 1h illustrates an operator operating the apparatus illustrated in FIG. 1a in the walk behind position.

As for the numerous mechanical components required, and for depth of understanding the versatility of the present invention, FIGS. 1d-1i are provided as an exemplary operable embodiment. As seen in FIGS. 1d-1f, a material moving apparatus 10 is disclosed comprising a support structure which supports a non-hydraulic grading tractor powered by at least one engine 14 and preferably adapted to move up to two cubic feet of material with one scoop of bucket 12. Apparatus 10 further comprises excavating bucket 12 and grading moldboard 46. In the excavating or ripping position, the operator stands on operator platform 77 (as seen in FIG. 1a).

As seen in FIGS. 1d-1g, optional counterweights 56 and 56' are disposed on material-moving apparatus 10 and add weight over driver wheels 80 and 80'. Weight on bucket 12 is preferably adjusted by the operator adjusting his/her weight by positioning himself/herself forward or backward over driver wheels 80 and 80' (or other areas, depending on use) as well as applying hand pressure at handlebar 64 as required. In contrast, the weight of grading moldboard 46 may be adjusted by the operator pushing down or lifting up of handlebar 64.

Engine 14 is connected to the support structure, while fuel tank 16 is disposed on engine 14. Cable 26 connects engine 14 to throttle control 58. As seen for example in FIG. 1c, clamshell cable 60 connects clamshell dump handle 62 to excavating clamshell 61 at cable connection 94, and this clamshell mechanism allows an operator to rotatably control the clamshell 61 in relation to the bucket 12 in order to access the cavity of the bucket 12 in order to dump out material from the bucket 12, or to insert material into the bucket 12, as needed. Drive sprocket/clutch elements 19 and 19' are disposed rotatably on drive shaft 18. Drive sprocket/clutch elements 19 and 19' are affixed to the shaft 18 and the shaft 18 turns both of them. Drive shaft 18 is disposed rotatably through bearings 20 and 20', which are secured to drive base plate 13 by fasteners 22 and 22' (FIG. 1e). Bucket 12 is disposed below and secured to drive base plate 13 by fasteners through slotted holes 15. Drive chains or belts 24 and 24' mechanically communicate with the engine 14 and the rotatable drive means 79, 79', 80, and 80'.

In one embodiment, clamshell dump handle 62 is connected to handlebar 64, as is the throttle control 58. Vertical angle adjustment handle 28 is connected by handle crank 30 and is used to adjust the vertical angle of the ground engagement attachment used. Threaded portion 32 connects handle crank 30 to angle adjustment upper connector rod 34. Blade vertical adjustment connection 54 or 54' is rotatably pin connected to blade control connections 38 or 38'.

There are many variations of an exemplary ground engagement attachment (as seen in FIG. 1*a*). As seen in FIGS. 1*b*-1*h*, for example, blade control connections 38 or 38' are connected to torsional member vertical connection 40 or 40' which is connected to support strut 42 or 42' which is connected to moldboard upper torsional member 66 or moldboard lower torsional member 66'. Blade vertical adjustment connection 54' connects to blade control connection 38' with pin 82. Moldboard center torsional member 41 is attached to torsional member vertical connection 40' and to moldboard vertical swivel support 65. Torsional member vertical connections 40 and 40' are attached to moldboard upper and lower torsional members 66 and 66' and to moldboard curved contact surface 47. Moldboard vertical swivel support 65 is attached to moldboard upper and lower torsional members 66 and 66' and to moldboard curved contact surface 47. Moldboard curved contact surface 47 is attached to moldboard upper and lower torsional members 66 and 66'.

As seen in FIGS. 1*b*-1*h*, for example, blade vertical adjustment connection 54 connects to vertical angle adjustment shaft 55 which passes rotatably through drawbar 70 and connects to blade vertical adjustment connection 54 and 54'. Angle adjustment lower connector rod 35 is connected to blade vertical adjustment connection 54' and angle adjustment connector rod 34. Further, horizontal swivel connection 49 is attached to drawbar extension 52 which is attached to drawbar 70. L pin 50 is disposed rotatably through horizontal swivel connection 49 and rotatably through vertical swivel connection 48.

As seen in FIG. 1*g*, for example, torsional top member 27 is attached to clamshell body 61 which is attached to clamshell pivot arm right 256, and clamshell pivot arm left 254. Clamshell pivot arm left 254 and clamshell pivot arm right 256 connect rotatably upon clamshell pivot pins left 250 and right 252, which are both attached to bucket 12.

As seen in FIG. 1*e*, engine support strut 17' supports engine 14. A rotatable drive shaft 18 is attached to drive sprocket clutch element 19' and passes through transmission 84. Optional counterweight 56' attaches to drawbar horizontal member 71' which is attached to drawbar vertical member 73' which is also attached to drawbar 70 (seen in FIGS. 1*d*-1*f*), and which is attached to bucket shim 75'.

An exemplary drive means has at least one wheel 80' which is attached rotatably on axle 79', the axle 79 being attached to drawbar vertical member 73' which is attached to bucket shim 75' which is attached to bucket 12.

As seen in 1*c*-1*e*, fasteners 86 allow swiveling of L linkage 33 which is operated up or down by rotating threaded portion 32 with vertical angle adjustment handle 28. When L linkage 33 is rotated, it moves rotatably connected angle adjustment lower connector rod 35 which is rotatably connected to pinned vertical angle connection 36 which is connected to vertical angle adjustment shaft 55 which passes rotatably through drawbar horizontal member 71' and drawbar 70 where vertical angle adjustment shaft 55 then connects to blade vertical adjustment connection 54'.

The ground engagement attachment may be angularly moved to either side of the apparatus 10 effortlessly. For example, drawbar extension 52 is rotatably passed through L pin 50 which passes rotatably through vertical swivel connection 48 which is then attached to moldboard vertical swivel support 65. The grading moldboard horizontal angle is adjusted to flow to either side of the machine by rotating the ground engagement attachment about L pin 50 and by connecting blade vertical adjustment connection 54' to blade control connection 38' with pin 82. Alternatively, the ground engagement attachment is angled in the other direction by rotating the ground engagement attachment about L pin 50 and connecting blade control connection 38 to blade vertical adjustment connection 54 using pin 82.

As seen in FIGS. 1*d*-1*f*, bucket blade 78 is attached to bucket 12 along the leading ground contact edge at the bottom of bucket 12. Ripper 72' is rotatably attached to bucket 12 by ripper pin 74', with rotation of ripper 72' being limited in both rotational directions by ripper stop 76'.

The exemplary ground engagement attachment (e.g., blade) illustrated in FIG. 1*b* is lightweight while providing more than adequate rigidity and torsional resistance, and comprising approximately one-third the materials and weight of a traditional design currently used on other grading machines. As seen in FIGS. 1*d* and 1*f*, a representative ground engagement attachment preferably comprises a composite torsional beam skeleton comprising three thin walled tubing sections comprising moldboard upper and lower torsional members 66 and 66', and moldboard center torsional member 41, held in position by three vertical support members, torsional member vertical connections 40 and 40' and moldboard vertical swivel support 65, and reinforced at the two ends with a diagonal support struts 42 and 42'.

A maximized moment of inertia is created in all three coordinate axes to resist shear and twisting moment forces created when cutting with the exemplary ground engagement attachment as shown in FIGS. 1*d*-1*f*. Major support is concentrated at the critical points, i.e. grading cutting edge 88 and blade control connections 38 and 38'. Moldboard curved contact surface 47 contains and directs the material by operator control and is not required to act as a structural support as in designs currently known in the art. As a result, it is believed that more than adequate structural integrity is provided to the apparatus 10 using, for example, 16 gauge sheet metal, which is six times thinner than traditional designs currently used.

Figure 1I:
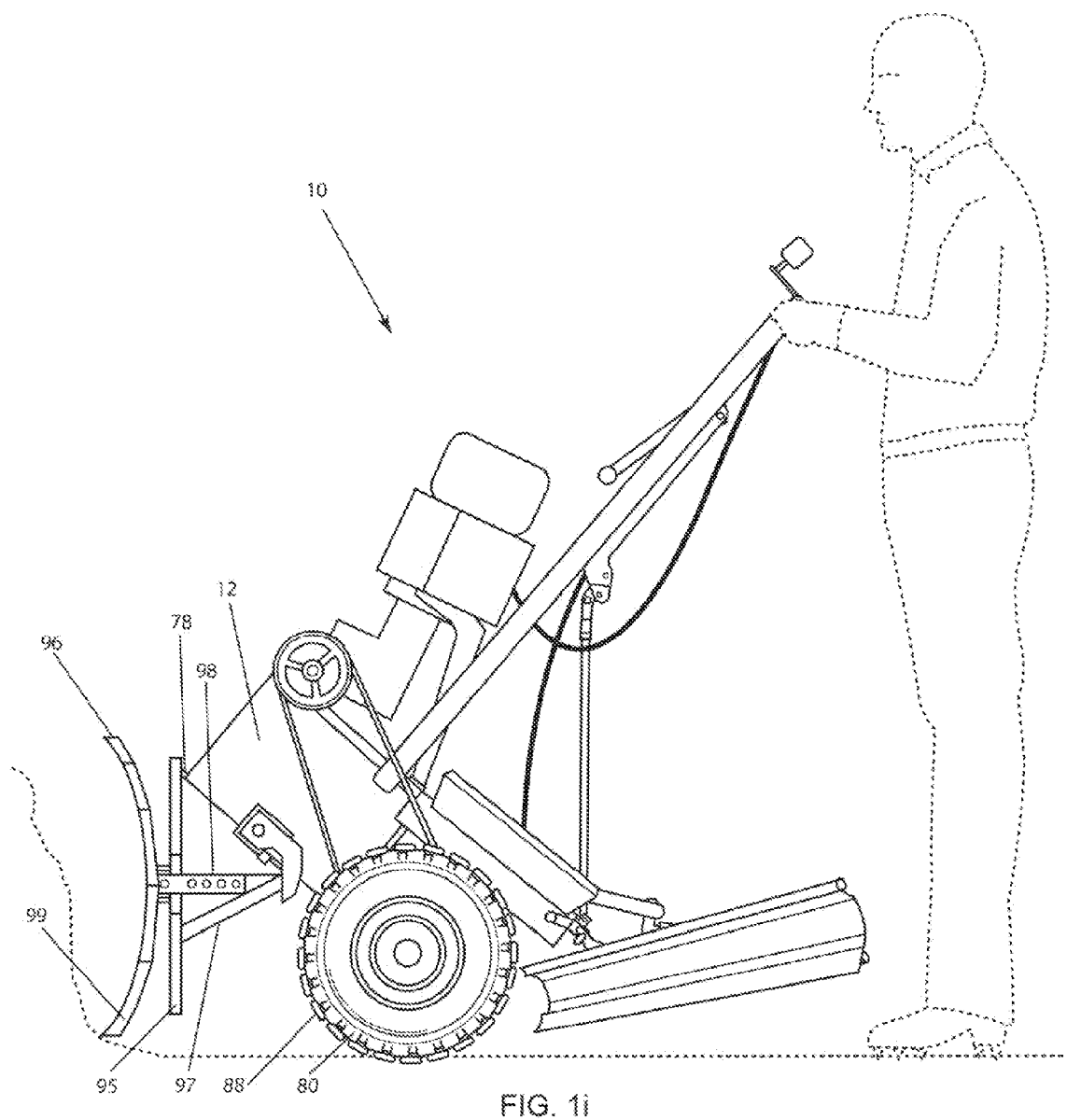
FIG. 1i illustrates an operator operating the apparatus illustrated in FIG. 1a with a snowplow attachment.

As seen in FIG. 1*a*, a method of operating the apparatus of the present invention comprises transitioning between two main working positions according to the principles inherent in, for example, moving a dolly. The apparatus is adapted for transition between two operating positions, namely, the mountable position (as seen for example in FIG. 1*a*) and the walk behind position (as seen in FIGS. 1*h* and 1*i*). In the mountable position, the apparatus 10 is propelled forward by tilting the centroid of the machine about the axles, employing two wheels of the apparatus, and centering its load over the drive axles when in the grading/travel position. The weight of the apparatus and operator is distributed to both the bucket's cutting edge 78 and the driver wheels 80 when the apparatus is tilted forward to the excavating/ripping position.

FIG. 1*e* is a front view of the material-moving apparatus 10 illustrated in FIG. 1*a*, and provides additional detailed exemplary illustrations of the present invention. For example, engine support struts 17 and 17' support engine 14. Engine 14 is attached to centrifugal clutch 11 which is attached to transmission input shaft 93 which is attached to worm gear reduction transmission 92. Driveshaft 18 is disposed rotatably through worm gear reduction transmission 92, and also disposed rotatably through bearings 20 and 20' where same driveshaft 18 is disposed through drive sprocket/clutch elements 19 and 19'. Drive chains 24 and 24' are disposed from drive sprocket/clutch 19 and 19' to driven sprockets 83 and 83'. Driven sprockets 83 and 83' are attached to wheels 80 and 80' which are rotatably disposed on axles 79 and 79' which are attached to drawbar vertical members 73 and 73'. Bucket blade 78 is attached to bucket 12. Throttle control 58 is attached to handlebar 64 which is attached to bucket 12. Throttle control 58 is disposed adjustably to a cable 26 to engine 14.

In one embodiment, the moldboard vertical angle (relative to the adjacent ground plane) is adjusted up or down by rotating a handle 28 located on the right side of the handle bar 64. Rotating the handle causes a threaded turnbuckle operator to move the blade vertical adjustment connection up or down.

FIG. 1f is a rear view of material-moving apparatus 10 illustrated in FIG. 1a. Clamshell dump handle 62 is disposed rotatably to handle bar 64 at clamshell dump handle pin connection or release mechanism 59. Clamshell dump handle 62 is attached to clamshell cable 60 at clamshell handle cable connection 63. Clamshell cable 60 connects from clamshell handle cable connection 63 to clamshell cable connector 94 which connects to clamshell body 61. Engine support strut 17 is attached to engine 14.

FIG. 1h illustrates an operator operating material-moving operating apparatus 10 in the walk behind position with the operator standing on the ground. The operations that are carried out while in this position include traveling only when no cutting or grading implements are in contact with the ground. This position also allows excavated material to be carried in the bucket 12 to where it is to be deposited, as determined by the operator. This same operating position enables dumping of excavated material when the operator pulls clamshell dump handle 62 upward in an arching motion which rotatably opens clamshell 61, thereby allowing excavated material to flow by gravity out of bucket 12 onto the ground between wheels 80 and grading moldboard 46. This excavated material is subsequently smoothed and excess material graded into the direction desired by the operator. Grading direction is dictated by the direction the grading moldboard is angled, and the thickness of material deposited on the ground is controlled by the operator's hand pressure on handle bar 64. When additional downward hand pressure is applied to the handlebar, a thinner layer is deposited on the ground and more excess material is extruded toward the following edge of grading moldboard 46, and a thicker layer of material is deposited on the ground with upward hand pressure to the handlebar. This same operating position enables grading operations where no material is dumped but only the ground located below the wheels is graded with the grading moldboard.

Additional traction for performing the above described operations is achieved by having the excavating bucket full of material, thereby adding weight to the overall apparatus. This type of operation may be useful to finish grading, or initial clearing and grubbing, in order to remove deciduous materials such as in cutting fire lines. This embodiment also enables the use of various ground engagement attachments such as plows and harrow discs, etc. which attach to the present invention the same way as the grading moldboard 46.

Thus, another exemplary embodiment of the present invention is illustrated in FIG. 1i. Here, an operator operating material-moving apparatus 10 is illustrated with a snowplow attachment 96. An exemplary snowplow attachment 96 comprises snowplow blade 99 deposited angularly adjustably on plow vertical member with swivel connection 95, and also to plow angle adjustment member 98. Snowplow attachment 96 attaches to the present invention by plow vertical member with swivel connection 95 clipping over bucket cutting blade 78 and also at horizontal plow member 97 where it contacts the underside of bucket 12 and plow vertical member with swivel connection 95. Optional tire chains 88 may be attached to wheel 80 to provide traction in snowy or slippery conditions.

The advantages of this snowplow embodiment include the following. The double blade (e.g., snowplow and moldboard) results in a cleaner pass than results when a single blade is used, similar to a multiple blade razor used for skin shaving. Additionally, lateral torques or moment forces resulting from angled blades counteract each other when both are angled in the same direction since they are on both front and rear sides of the drive wheels, resulting in opposing resultant forces at each blade. An angled blade always torques toward the leading edge of the blade, which aids in preventing unmanageable strain to the operator in slippery conditions, who may maintain straight forward travel of the machine via lateral hand pressure on the handle bar. Leeward force is counteracted if blade angles are opposed, but moment doubles about the centroid of the apparatus.

When using the snowplow attachment as illustrated in FIG. 1i, snow that overtops the front blade falls into the bucket 12 and is directed downward to the rear blade. The engine of the present invention is positioned high above any snow flow so it has much less susceptibility to malfunction due to salt or sand that has been applied to the snow and ice when compared to other machines currently known and/or for sale.

Thus, another advantage of the present invention is that it has year-round application. Using various attachments, the operations of the present invention include but are not limited to the following: plow snow in the winter, till and grade the garden in the spring, and engage in a variety of construction projects in other times of the year.

One exemplary method of using the present invention comprises the following. Steering of the apparatus or machine 10 or 200 is accomplished via two different methods which are relative to the operator in relation to the machine. The first method of steering is when the operator is standing on top of an operator platform above the bucket 12, such as seen in FIG. 1a. While the machine is in this position, steering is accomplished via independently driven wheels. Cutting blade 78 pressure on the ground is adjusted via the operator's standing position on top of the bucket. Thus, the operator can lean forward to put more pressure on the cutting blade and lean back to lessen pressure as the apparatus moves in a forward or traveling direction.

A second exemplary method of steering comprises the operator walking behind the machine while it is in the grading position such as seen in FIGS. 1h and 1i. Steering and blade pressure is accomplished via the operator's hand pressure on the handlebar, and steering is also complemented by independently driven wheels. Dumping of the payload in the bucket 12 is accomplished while the apparatus 10 is in grading position and the operator manually opening the rear clamshell 61 via remote cable 60. The operator controls the speed of the apparatus via a hand throttle control on the support structure handlebar while in either of the apparatus positions.

There are at least three different methods of steering the machine linked to three different embodiments (e.g., FIGS. 1a-1i, FIGS. 2a-2f and FIGS. 3a-3c) of the present invention. The method of operating the first embodiment does not include steering it while in the mountable position and comprises propelling both drive wheels evenly resulting in a straightforward propulsion. The method of operating the first embodiment also comprises steering it while in the walk behind position. As disclosed below, the method of operating the second and third embodiments comprises steering the embodiments while in the mountable position with the independently operated traction systems.

Figure 2A:
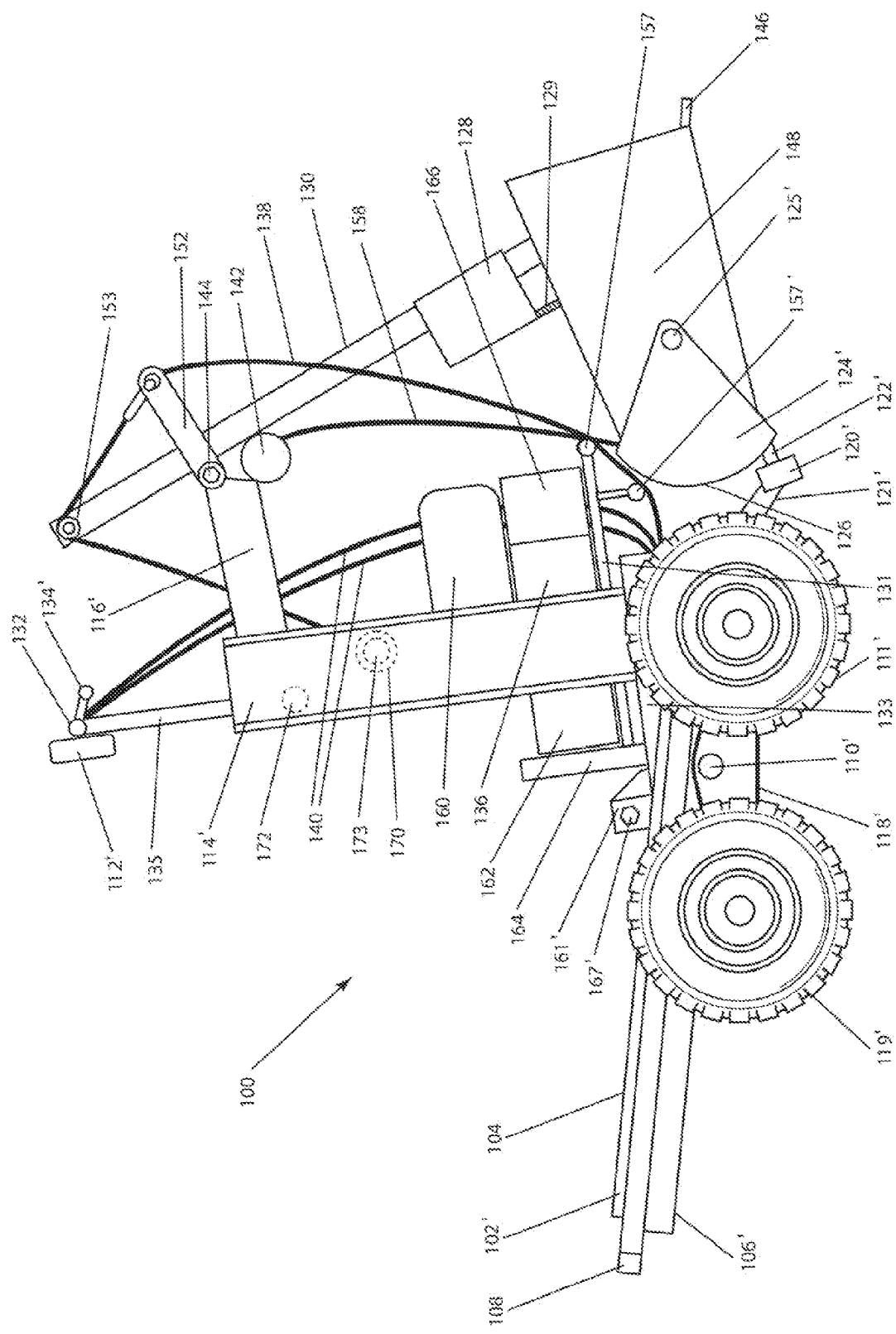
FIG. 2a is a side view of an alternate embodiment of the present invention comprising a material-moving apparatus.

FIG. 2a is a side view of an second exemplary operational embodiment of the present invention comprising four-wheeled or endless tracked material-moving apparatus 100.

Wheels 111' and 119' are connected to tandem axle connection 118'. Tandem axle connection 118' is disposed rotatably to tandem swivel 110' which is attached to main frame platform 133. This embodiment uses many of the same principles as shown in FIGS. 1a-1i but has been adapted to elevate excavated material to a point high enough that it is dumped into a trailer or other material carrying device. This embodiment is also designed around the goal of being environmentally friendly, inexpensive to produce, purchase, and operate, and comprising a lightweight design which results in ease of shipping to the purchaser, and ease of transport to jobsite by purchaser. While winches and cables are disclosed in the exemplary embodiment that follows, a hydraulic means of operating each of the mechanisms described as well as a hydrostatic drive system is also contemplated as part of this invention, while maintaining the original structure.

As seen in FIGS. 2a-2f, four-wheeled material-moving apparatus 100 comprises rotatable bucket or bucket body 148 with cutting edge or blade 146. Bucket 148 attaches to clamshell body 126, clamshell arm 124', and clamshell spring 125'. Vertical angle adjustment bracket 128 is attached to bucket vertical adjustment 129 which connects to boom 130. Boom 130 is rotatably attached to bucket 148. Cable 138 connects boom 130 to boom winch 170. Boom winch 170 attaches to mast horizontal member 173. Mast horizontal member 116' connects rotatably to boom 130 via boom pin 144. Fuel tank 160 is disposed on top of engine 136. Engine 136 is disposed adjacent to alternator 166 and battery 162. Battery box 164 connects to main frame platform 133. Bucket stop lock 122' is attached to bucket stop 120', which is attached to stop lock member 121'. Mast vertical member 114' is attached to main frame platform 133. Winch controls 112' are attached to handlebar 132 and control cables 140. Control lever 134' controls steering to right tandem axle connections. Handlebar 132 is connected to handlebar riser 135 which is connected to mast horizontal strut 172. Engine 136 is attached to engine platform 131, which is attached to mast vertical members 114 and 114'.

In one embodiment, platform hinge connection 161' is attached rotatably to both operator platform 104 and main frame platform 133 via pin 167'. Counterweight rail 102' is disposed on operator platform beam 106' which are both attached to operator platform 104. Platform torsional member 108 is attached to counterweight rail 102'.

In another embodiment, a counterweight actuator mechanism is employed. Here, an exemplary counterweight actuator mechanism includes a counterweight actuator 152 connecting cable 138 to boom 130. Boom winch cable 138 runs through boom winch pulley 153, counter-weight guide pulleys 157 and 157' and is attached to counterweight actuator 152. Counterweight actuator 152 is attached to mast horizontal member 116' rotatably via boom pin 144. Clamshell winch 142 controls clamshell cable 158 which connects to clamshell body 126.

Figure 2B:
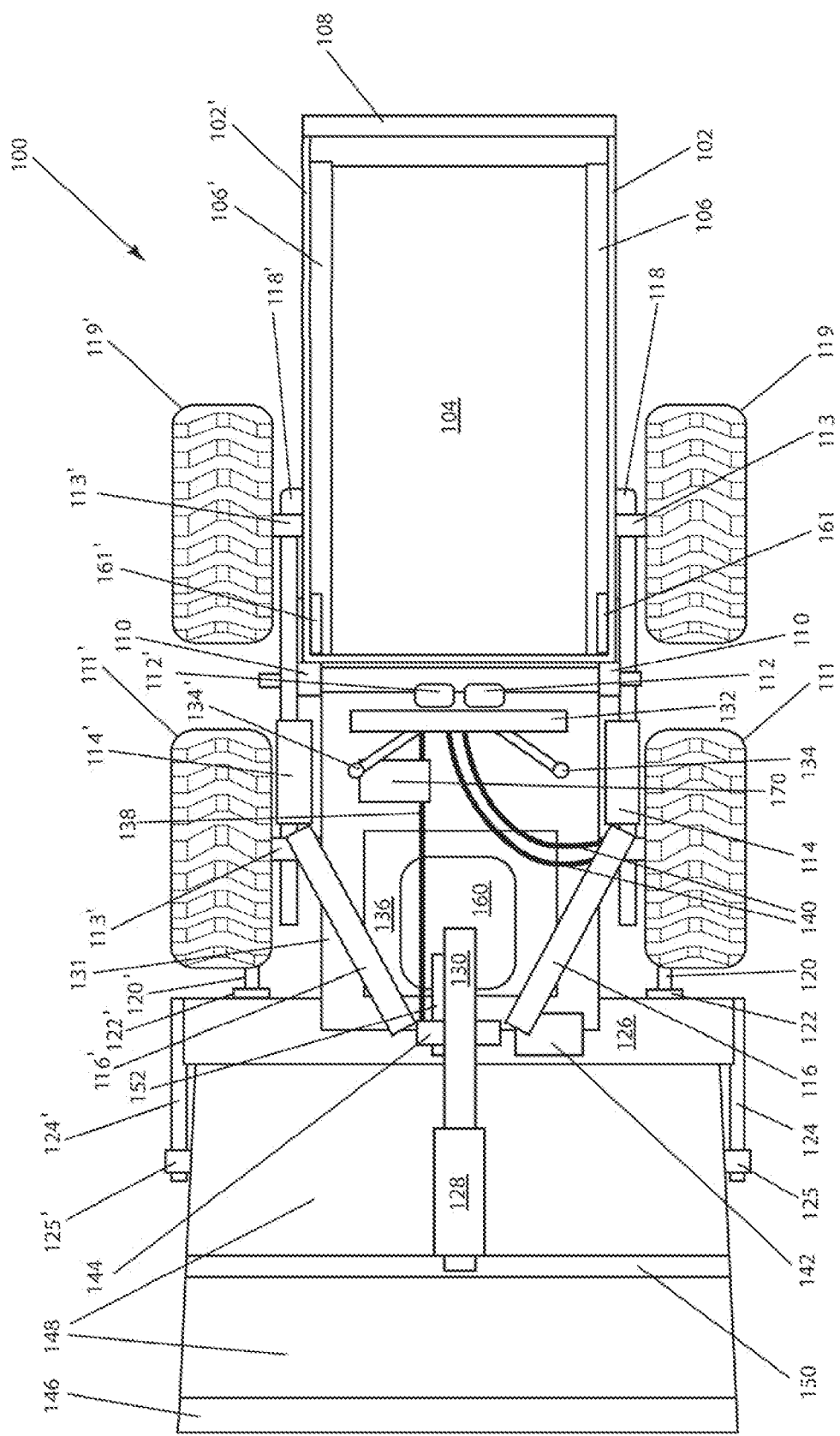

FIG. 2b is a top view of the apparatus of the present invention comprising four-wheeled material-moving apparatus 100 illustrated in FIG. 2a. Wheels 111', 111, 119 and 119' are connected via drive axles 113' and 113 to tandem axle connection 118' and 118. Tandem axle connections 118 and 118' are disposed rotatably to tandem swivel 110. Counterweight rail 102 is disposed on operator platform beam 106 which are both attached to operator platform 104. Bucket 148 attaches to clamshell arm 124 and clamshell spring 125. Bucket stop lock 122 is attached to bucket stop 120. Mast vertical member 114 is attached to main frame platform 133. Control lever 134 controls steering to left tandem axle connections. Winch controls 112 are attached to handlebar 132. Platform hinge connection 161 is attached rotatably to operator platform 104. Bucket beam 150 is rotatably attached to boom 130, and also attached to bucket 148.

Figure 2C:
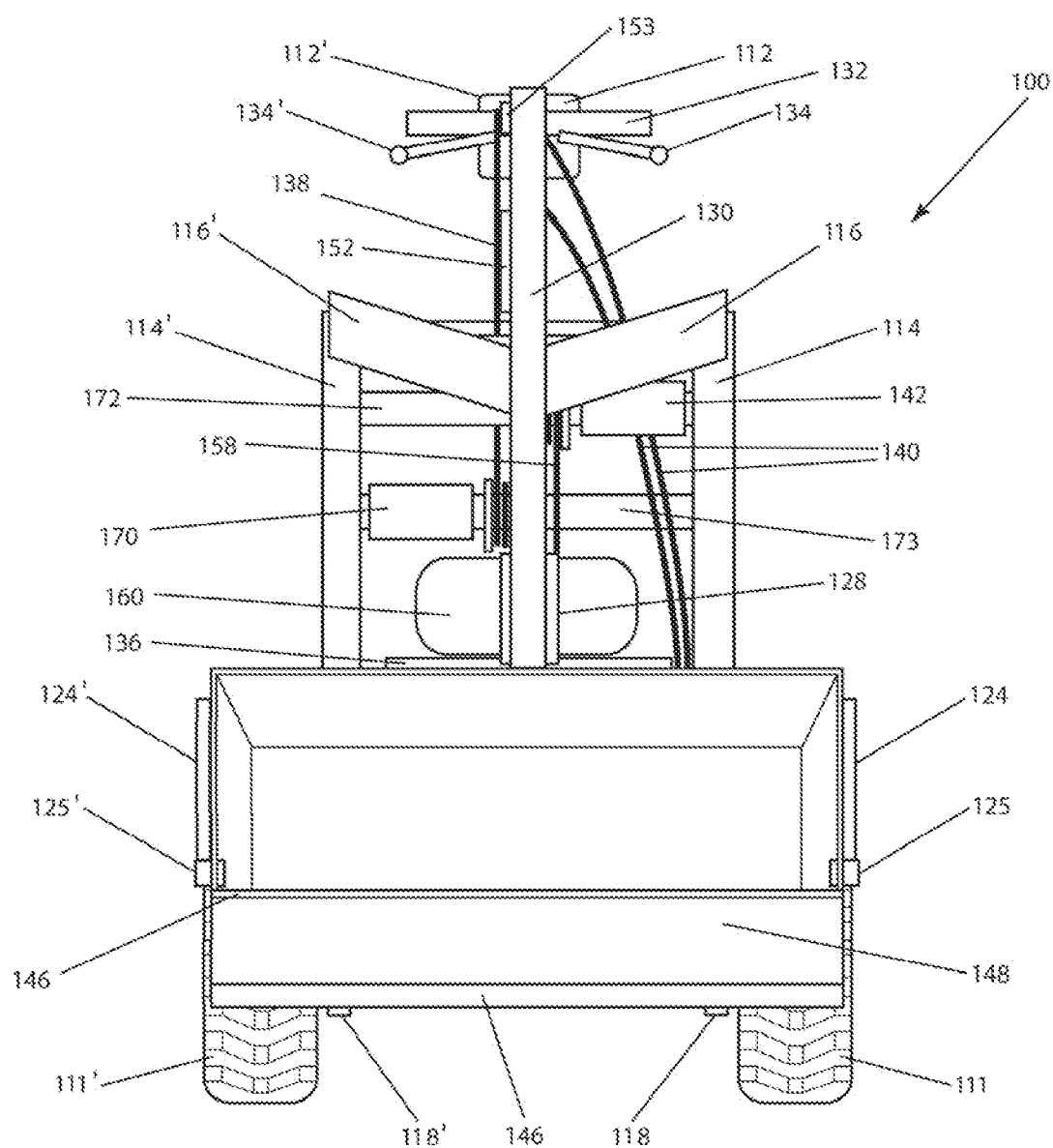

FIG. 2c is a front view of the apparatus comprising four-wheeled material-moving apparatus 100 illustrated in FIG. 2a. Boom winch 170 attaches to mast horizontal member 173.

Figure 2D:
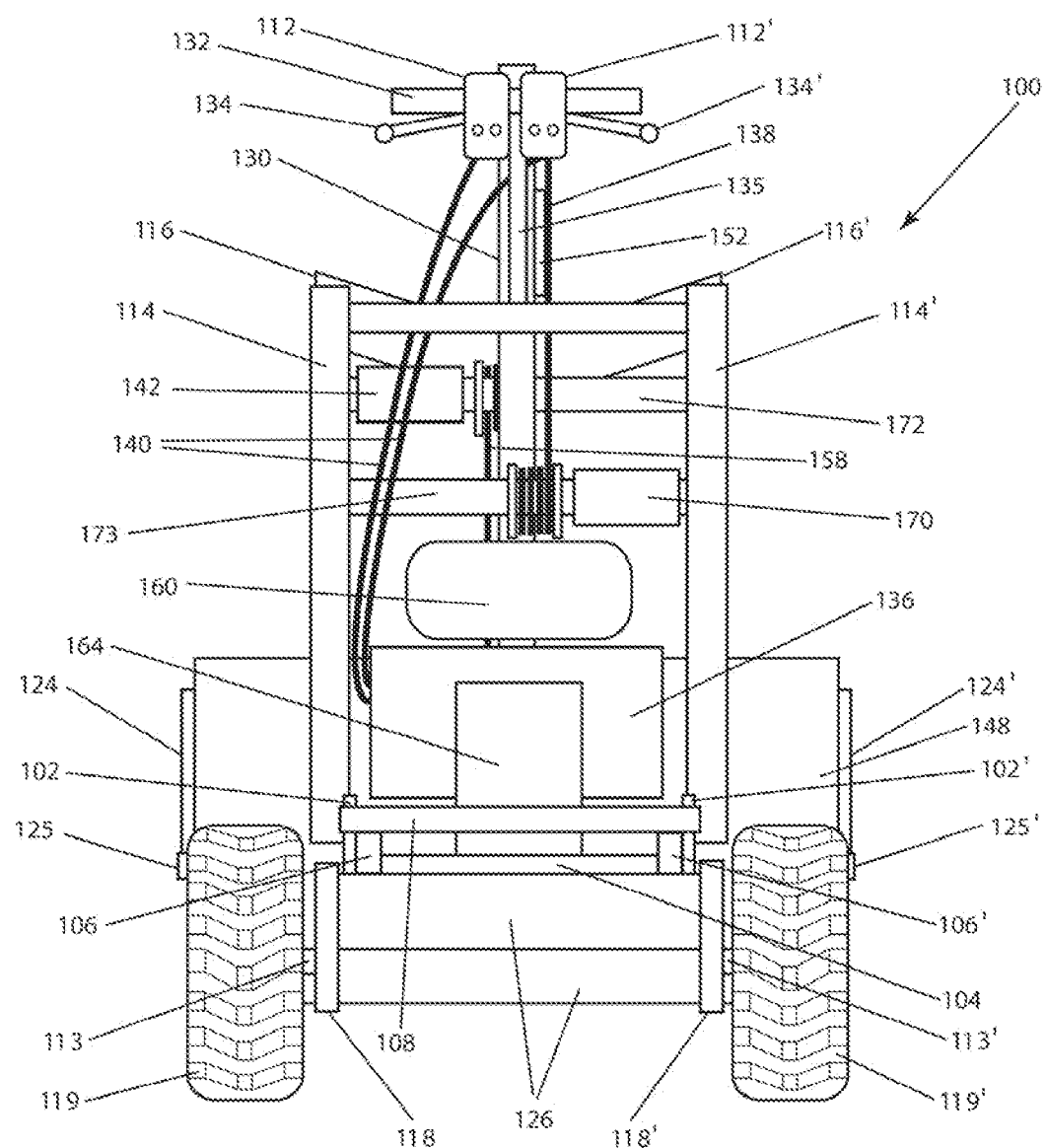

FIG. 2d is a rear view of the apparatus comprising four-wheeled material-moving apparatus 100 illustrated in FIG. 2a.

Figure 2E:
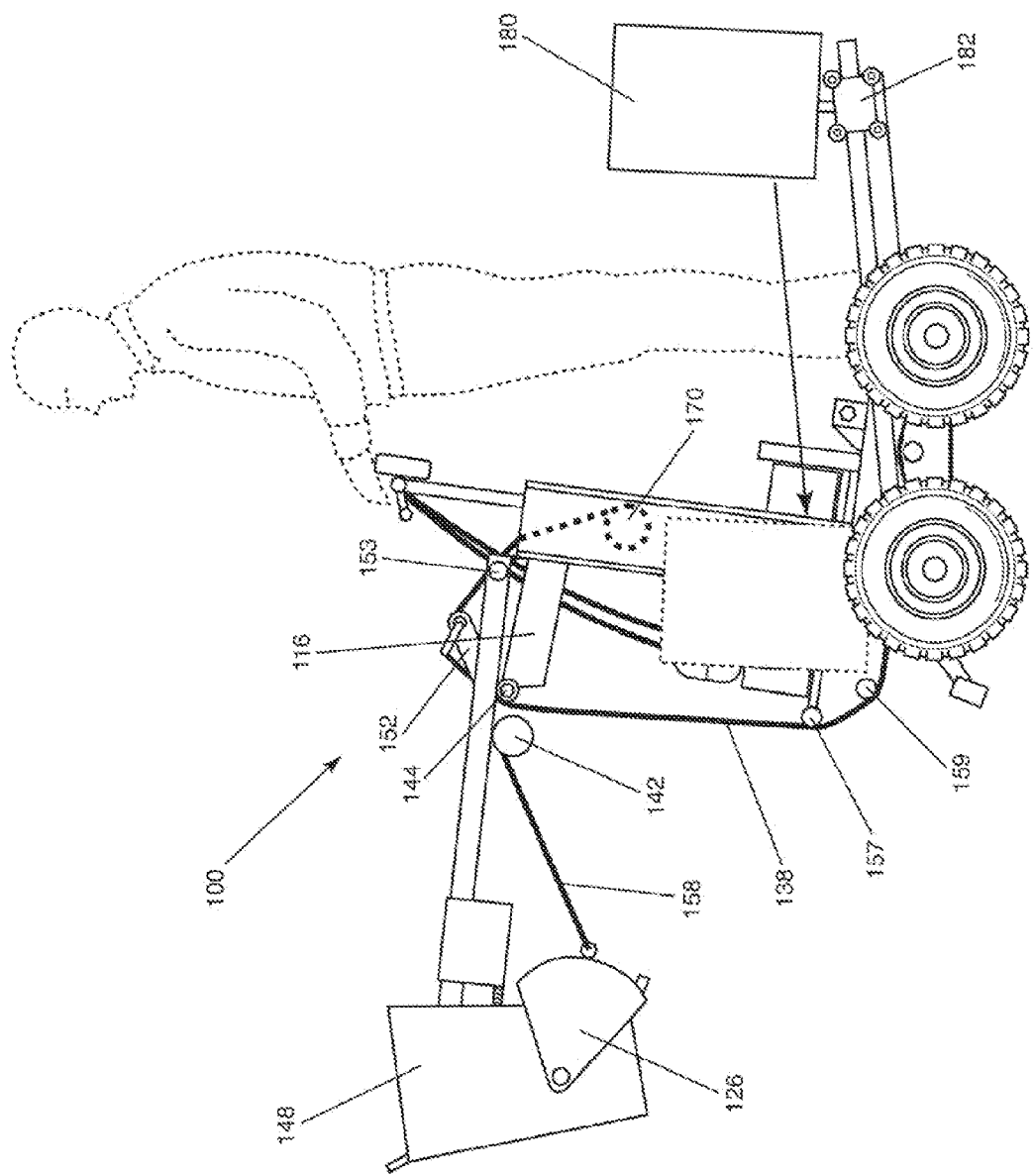
FIG. 2e illustrates an operator operating the apparatus illustrated in FIG. 2a with a counterweight in an extended position and with the bucket elevated.

FIG. 2e illustrates the apparatus comprising four-wheeled material-moving apparatus 100 illustrated in FIG. 2a operated with bucket 148 attachment in an up and open position. Boom winch cable 138 runs through boom winch pulley 153, counter-weight guide pulley 157, and is attached to counterweight actuator 152 and counterweight trolley 182. Counterweight actuator 152 is attached to mast horizontal member 116 and 116' rotatably via boom pin 144. Clamshell winch 142 controls clamshell cable 158 which connects to clamshell body 126.

Figure 2F:
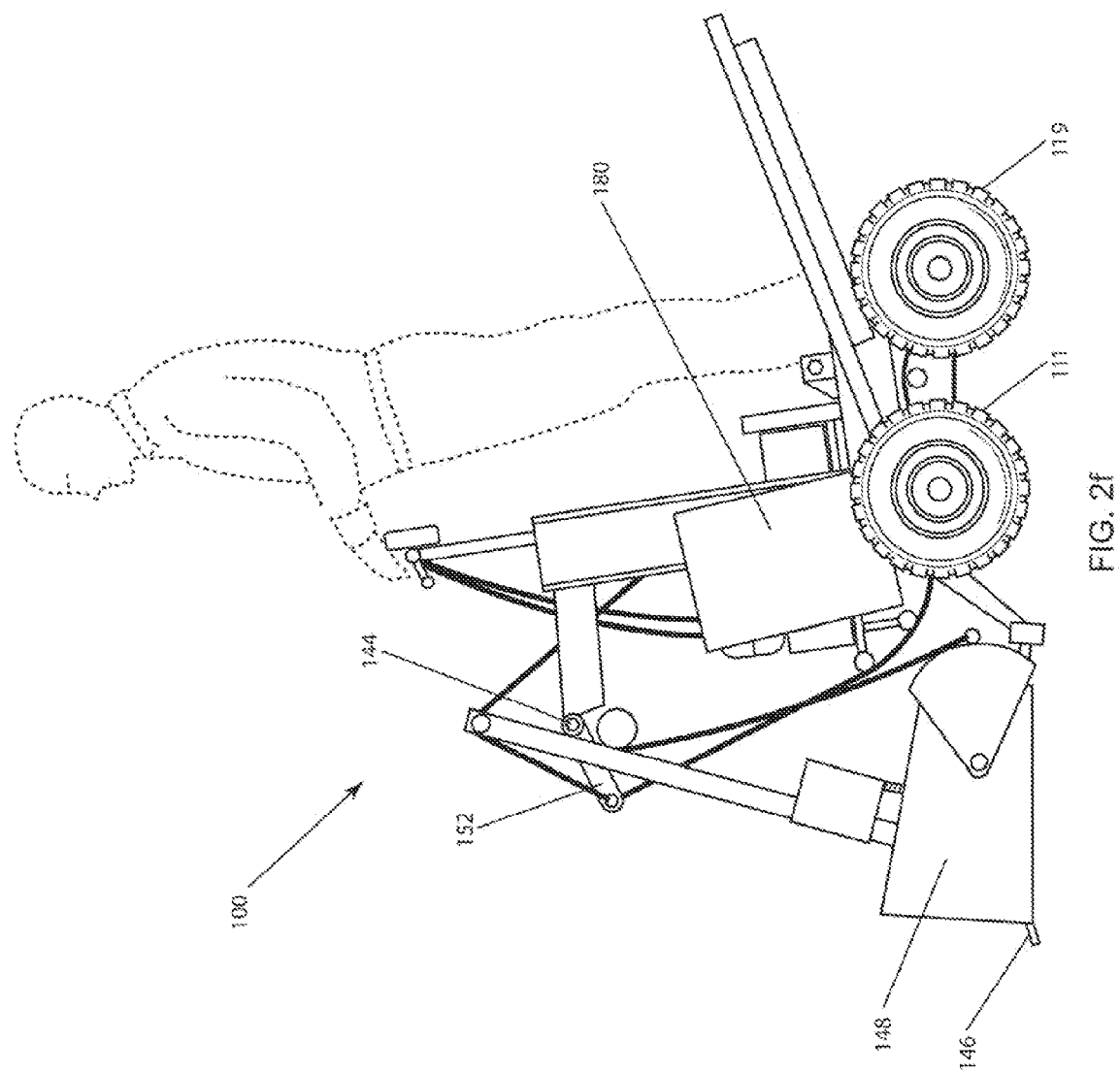
FIG. 2f illustrates an operator operating the apparatus illustrated in FIG. 2a with the counterweight retracted to a forward position and the apparatus in a digging or cutting position.

FIG. 2f illustrates the four-wheeled material-moving apparatus 100 illustrated in FIG. 2a operated with bucket 148 in the cut position. Counterweight 180 is disposed in the forward position and thus applies weight to both cutting edge 146 and driver wheels 119 and 111.

Figure 3A:
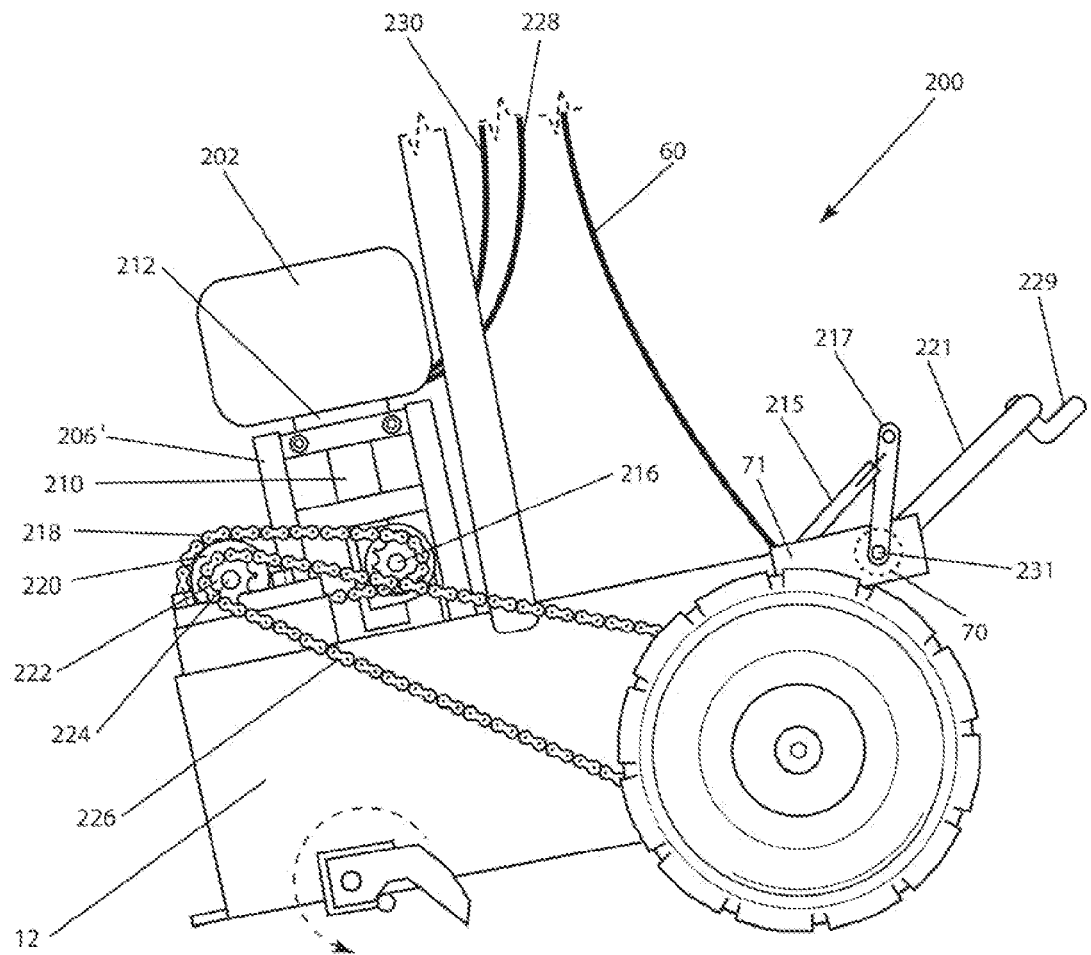
FIG. 3a is a side view of the apparatus illustrated in FIGS. 1a-1g using a dual engine drive system.
Figure 3B:
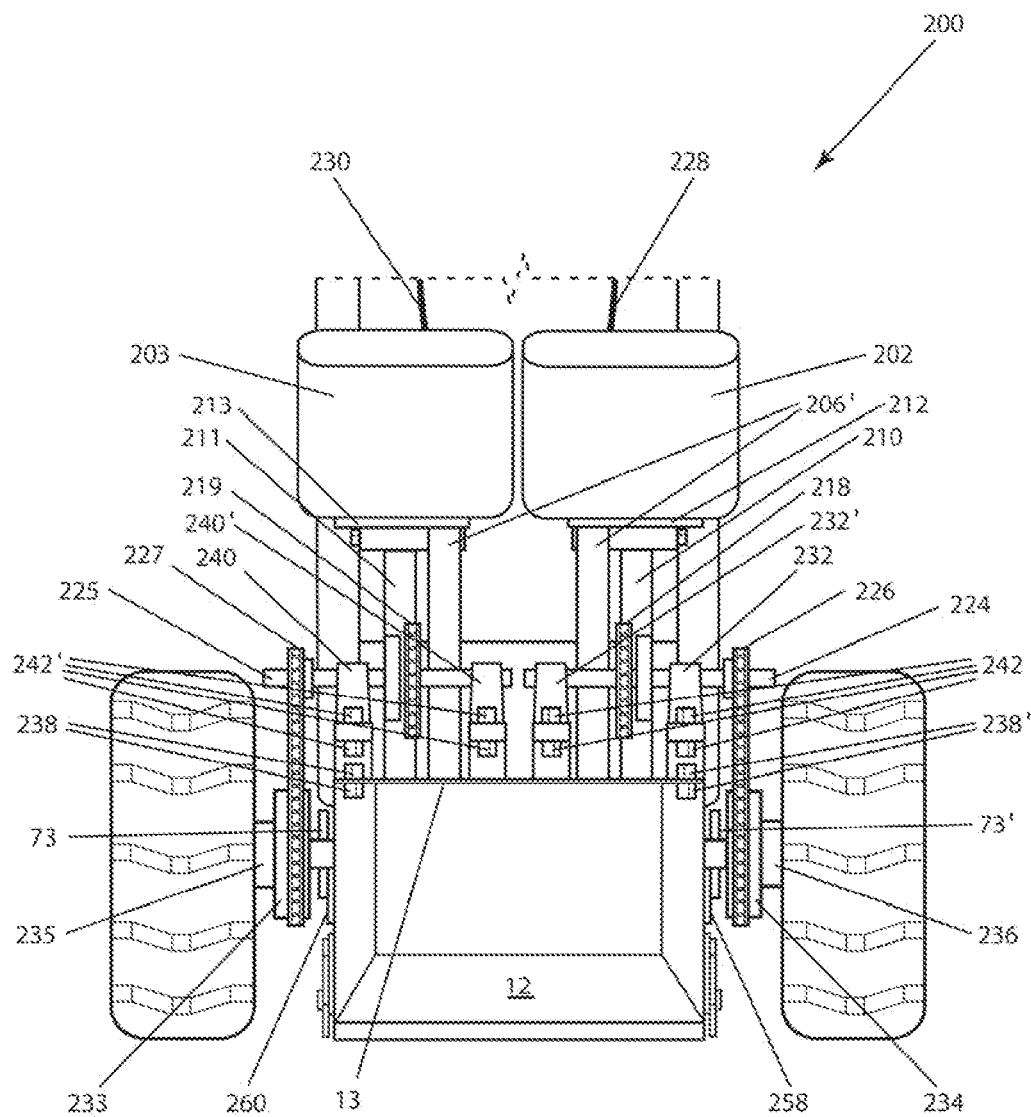
Figure 3C:
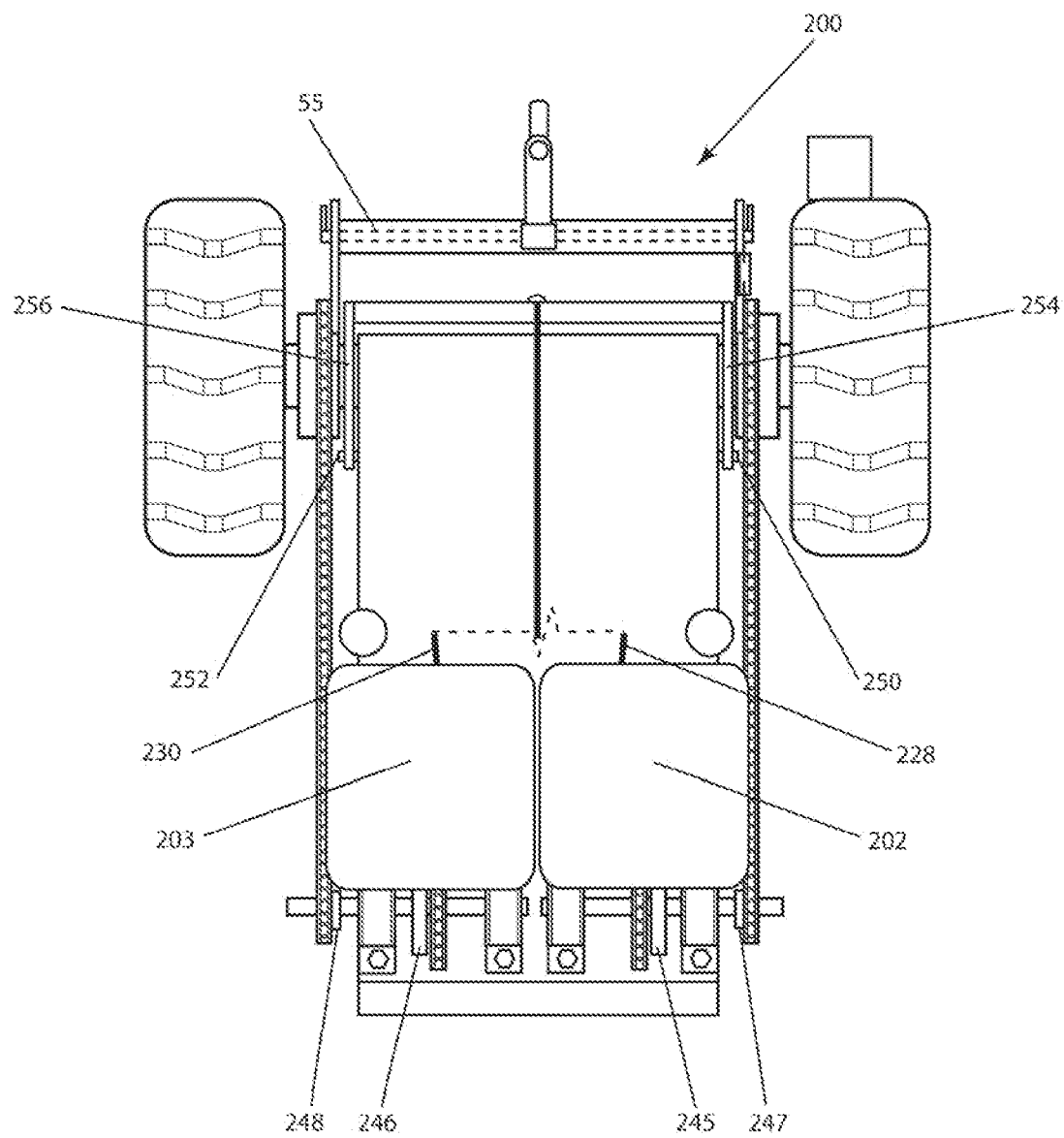

Another exemplary method of operating the present invention also comprises a dual engine embodiment as seen in FIGS. 3a-3c. The dual engine embodiment uses only the two separate trigger style throttle controls that control each of the engines. The trigger that is operated by the left hand index finger accelerates the right engine when depressed, and the trigger operated by the right hand index finger accelerates the left engine when depressed. The amount of depression of each trigger determines the amount of acceleration. When a trigger is released it allows the engine to return to an idle which in turn locks the wheel driven by that engine. The single engine model uses a single trigger style accelerator operating in the same manner as the aforementioned.

FIGS. 3a-3c illustrate another exemplary operational embodiment of the present invention. As seen, FIG. 3a illustrates a side view of the apparatus comprising dual engine material-moving apparatus 200. Exemplary dual engine material-moving apparatus 200 comprises a dual engine drive system and a single turnbuckle for the moldboard vertical angle adjustment, and differs from that shown in material-moving apparatus 10 in FIGS. 1a-1i. The system shown in FIGS. 3a-3c has the advantage of simpler operator controls, fewer wear parts, and less expense to manufacture, but has the disadvantage of having to start and maintain two separate engines. Additionally, the moldboard vertical angle must be adjusted when the machine is stopped, then adjusted directly at the blade vertical adjustment connection 54 by turning the turnbuckle in or out thereby causing the moldboard vertical blade angle to change. Those of skill in the art will realize that while a turnbuckle is disclosed in this embodiment, other means for adjusting the moldboard vertical angle may be used. This type of drive and angle adjustment may be used on less expensive models which are marketed to the general public or rental market due to the fact that it is the simplest to learn to operate, and is the most durable, and least expensive to purchase and maintain.

Steering of this third embodiment may be accomplished employing two separate throttle controls operated by the index and middle fingers of the same hand. The embodiment is steered by simply raising or lowering the rpm of the engine that independently drives each wheel while the apparatus is in either the mounted or walk behind position, as well as by skidding of the wheels via hand pressure while in the walk behind position.

Engine left 202 is preferably disposed on centrifugal clutch housing left 212 which is connected to reduction gear input shaft housing left 210 and which is passed rotatably through by reduction gear output shaft left 216 and which is attached to reduction gear output sprocket left 214. Centrifugal clutch housing left 212 is disposed on engine mounting frame risers 206 and 206' with engine mounting bolts 204. Engine mounting frame cross member 208 connects to engine mounting frame risers 206 and 206' which then both connect to bucket 12. Reduction gear chain left 218 is disposed on both reduction gear output sprocket left 214, and Jack-shaft input sprocket left 220 is disposed on Jack-shaft left 224. Jack-shaft output sprocket left 222 is disposed on Jack-shaft left 224. Final drive chain left 226 is disposed on Jack-shaft output sprocket left 222. Throttle control cable engine left 228 connects to engine left 202. Blade vertical adjustment 217 is disposed on vertical angle adjustment shaft 231. Moldboard vertical angle turnbuckle 215 is attached to blade vertical adjustment 217 and to drawbar horizontal member 71. L pin 229 passes rotatably through drawbar extension 221, which is attached to drawbar 70.

FIG. 3b illustrates a front view of dual engine material-moving apparatus 200. Throttle control cable right 230 attached to engine right 203 is disposed on centrifugal clutch right 213 which attaches to reduction gear input shaft housing right 211. Centrifugal clutch right 213 is disposed on engine mounting frame riser 206'. Jack-shaft right 225 passes rotatably through Jack-shaft bearings right 240 and 240' which are fastened to drive base plate 13 with bearing fasteners 242'. Drive base plate 13 is attached to bucket 12 with engine plate to bucket fasteners 238 and 238'. Jack-shaft left 224 passes rotatably through Jack-shaft bearings left 232 and 232' which are fastened to drive base plate 13 with bearing fasteners 242. Reduction gear chain right is disposed on Jack-shaft right 225 Final drive chain right 227 is disposed on Jack-shaft right 225. Final drive chain right 227 is also disposed on final drive sprocket right 233, which is disposed on sprocket to wheel member right 235. Final drive chain left 226 is disposed on final drive sprocket left 234, which is disposed on sprocket to wheel member left 236. Drawbar to bucket connector shims left 258 and right 260 connect bucket 12 to drawbar vertical member left 73 and right 73'. Reduction gear chain right 219 drives Jack-shaft input sprocket right 246.

FIG. 3c illustrates a top view of dual engine material-moving apparatus 200. Clamshell pivot arm left 254 and clamshell pivot arm right 256 are connected rotatably on clamshell pivot pin left 250 and clamshell pivot pin right 252. Jack-shaft input sprocket left 245 is rotatably attached to jack-shaft left 224. Jack-shaft output sprocket left 247 is rotatably attached to jack-shaft left 224, and drives final drive chain left 226. Jack-shaft input sprocket left 246 is rotatably attached to Jack-shaft right 248. Jack-shaft output sprocket right 248 is rotatably attached to Jack-shaft left 225, and drives final drive chain left 227.

The single engine embodiment as seen in FIGS. 1a-1i comprises wheels independantly controlled by either separate clutch or braking for each wheel. In contrast, the dual engine embodiment as seen in FIGS. 3a-3c comprises wheels controlled by a separate engine and transmission for each wheel. The method of operating the dual engine embodiment comprises steering by increasing one engine's rpm greater than the other engine's rpm for more gradual turns.

One method of operating the present invention comprises sharply turning the apparatus when one engine is idled, thereby disengaging the centrifugal clutch at the worm gear input shaft to the reduction gear and stopping it, thus causing the reduction gear to lock the wheel that it drives. The power to the opposite wheel is maintained causing rotation of the apparatus about the locked wheel. The dual engine embodiment performs much the same way as a hydrostatic drive system with separate drives at each wheel might, with the exception being the dual engine system cannot reverse the wheels, whereas a hydrostatic system can reverse the wheels.

Another method of operating all three embodiments of the present invention comprises reversing the apparatus by skidding one wheel at a time while in a walking pattern by using the operator's lateral hand pressure on the handlebar when the apparatus is in the walk behind position. Typically, three or four tire steps provide adequate clearance to turn a sharp forward 180 degrees. FIGS. 1h and 1i illustrate the position of the apparatus and operator while performing these methods.

Another method of operating all three embodiments of the present invention comprises controlling the apparatus' grading depth when it is in the walk behind position. The operator's hand pressure on the handlebar 64 as well as the vertical angle control 28 of the blade adjusts the depth. The vertical angle control 28 adjusts the amount of cut along the length of the moldboard blade. The leading end of the cutting edge depth is preferably inversely proportionate to the following cutting edge depth. This method further preferably comprises steering via the independently operated traction systems in both the second and third embodiments. This method may also comprise skidding the tires in the desired direction caused by the operator's lateral hand pressure on the handle bar.

Another method to use the present invention further comprises adjusting the dump flow volume by the operator adjustably opening the clamshell disposed at the rear of the bucket. FIGS. 1h and 1i illustrate the position of the operator and machine during operation of the apparatus.

When the present invention is compared to existing machines on the market, the entire machine that carries the excavation bucket and grading blade has been eliminated and weights have been added in the appropriate position to aid in applying traction. The complex hydraulic or mechanical systems used on other machines to lift or dump material have also been eliminated.

Another method of operating the present invention comprises dumping and grading of material in one step rather than two steps. When material is dumped, it comes out in front of the grading blade which then uniformly spreads material to the desired thickness on the ground while extruding any excess material off into a windrow at the following end of the moldboard. This material along with excavated material being dumped on the ground is then used in the next cycle of the machine as it traverses an area adjacent the area traversed by the previous cycle.

The operator's standing position on the bucket in relation to the pivot point of the traction system controls and adjusts the cutting or scarifying depth of the apparatus when it is in the mountable position. The operator standing forward of the pivot point, which is located at axle 79, exerts and applies additional downward pressure to the cutting edge or scarifier teeth. When the operator moves his or her weight toward the rear of the bucket, less downward pressure is applied to the cutting edge or scarifier teeth, and additional pressure is applied to the drive wheels.

The invention is further illustrated by the following non-limiting examples.

Example 1

One embodiment of the present invention was used to grade a hard packed, rutted, potholed base course gravel roadway. The length of road used in the test was approximately 100 feet long and 18 feet wide. The duration of time needed to complete the task was approximately one hour and 45 minutes with the end result being a smooth surface across the entire roadway with a two inch crown placed down the length of the centerline of the road (the roadway center elevation was two inches higher than the roadway edge's elevation) and drainage ditches cut along both sides of the roadway. The machine used in the test is shown in FIGS. 3a-3c using the embodiment of the invention comprising a dual engine drive system.

This embodiment provided approximately the same functionality as a hydrostatic drive system with the exception that the dual engine drive system does not have the capability of reversing the wheels. Therefore, reversing was accomplished by walking the wheels back via hand pressure on the handlebar while the machine was in the walk behind position.

The advantages of a dual engine drive over a hydrostatic drive include but are not limited to simplicity, minimal cost, increased efficiency of a direct drive over a hydrostatic drive of approximately 50% to 75%, and weight is approximately ⅓ that of a hydrostatic system. The amount of oil necessary in a hydrostatic system of this size is five to seven gallons, compared to ½ pint per reduction gear in the dual engine drive system, i.e. 56 times less, thereby resulting in the dual engine design being much more environmentally friendly.

The base weight of the apparatus was approximately 200 pounds. A counterweight of 75 pounds was added at drawbar horizontal members 71 and 71' over each wheel, bringing the total machine weight to 350 pounds. A 220 pound operator was used in the test, bringing the gross mounted weight to 570 pounds.

Initially, drainage "V" ditches were cut along both roadway edges with excess material windrowed away from the roadway. The ditches were cut using grading moldboard 46, which was adjusted to a sharp vertical angle such that the corner of the leading edge of the blade made first contact with the ground. The roadway was then ripped lengthwise approximately 2.5 inches deep with furrows spaced approximately 9 inches apart using rippers 72 and 72'. Several high spots were then excavated using bucket 12 with the operator in the mounted position. The excess material excavated was then carried, dumped and spread, using bucket 12 and grading moldboard 46, into the potholes, thus bringing them to grade. This portion of the work was carried out with the operator in the walk behind position. Subsequently, grading moldboard 46 was used with the operator in the walk behind position to grade the loosened material starting from the outside edges working toward the center of the roadway, which filled in most of the rutting in the roadway, and built up the crown along the roadway centerline. The final step in the grading was then performed by grading excess material from the center of the roadway toward the outside edges using grading moldboard 46 with the operator in the walk behind position. All rutting or potholing was filled in and a fine smooth finish across the entire roadway was achieved. The loose gravel rock was mixed with the fine grained binder material, which holds and binds the entire roadway wear surface together, resulting in a condition similar to the original base course condition.

Example 2

This example utilized the embodiment illustrated in FIGS. 1a-1i, comprising a single engine drive with drive sprocket clutches 19 and 19' fitted with a snowplow attachment 96 on the front end as shown in FIG. 1i. Plow vertical member with swivel connection 95 was attached to bucket 12 by clamping around bucket blade 78, and horizontal plow member 97 was attached to bucket 12 with slotted hole fasteners at the bottom of the bucket near ripper stops 76 and 76'. Snow was plowed with the embodiment in an asphalt parking lot with a snow accumulation of approximately one foot with some packed snow, as evidenced by tracks from approximately three or four cars prior to starting the test. The size of the lot was 50 feet by 100 feet inside of the parking bumpers with a total of sixteen parking spaces in the lot with a twenty-foot wide roadway down the middle of the lot. Tire chains were also fitted on the embodiment used in this example.

The advantages of this embodiment of the present invention comprising the snowplow attachment include the following. The double blade gave a cleaner pass than a single blade did, similar to a multiple blade-shaving razor. The angled blade torqued toward the leading edge of the blade. Moment force resulting from angled blades counteracted each other when both blades were angled in the same direction since they are on both front and rear sides of the drive wheels, and resulted in opposing resultant moments about the drive axles.

The grading moldboard 46 used in this example comprised the most rigid blade possible and used the least amount of material, thereby the lightest weight blade possible was created, and weighed approximately sixteen pounds. A proportionate moldboard to tractor weight ratio was maintained for balancing purposes, as well as a reduction of manufacturing cost. A traditionally-designed blade providing the required torsional resistance would be made of ⅜ inch thick steel plate rolled to a cupped moldboard shape, with a vertical swivel connection, blade vertical angle adjustment connections, and cutting edge then added. The traditional blade weighed approximately 45 pounds (almost three times the blade weight of the present invention), or almost ¼ of what the base machine without moldboard or counterweights attached weighs.

The length of the blade was approximately 145% the width of the wheels allowing a graded area slightly larger than the width of the wheels when the blade was angled at 45 degrees to the drive axles.

Initially the snow was windrowed toward the parking bumpers which were positioned along either side of roadway between them, starting at the center of the roadway. After six three-foot wide passes were made along either side of the centerline of the roadway using the embodiment of the present invention with both the blades windrowing towards the parking bumpers, a packed windrow of approximately three feet in height was developed. The snowplow attachment 96 angle was then adjusted parallel with the bucket blade 78 via changing the hole positions of the fasteners in plow angle adjustment member 98. The present invention thus operated as a dozer with snowplow attachment 96, which pushed material forward. The grading moldboard 46 windrowed material in one desired direction. The windrows were then pushed straight towards and over each of the parking bumpers, an approximately 7-10 foot push. The dribble from the dozing operation was then cleaned by grading moldboard 46 windrowing to the parking bumpers, which took approximately three passes on each side of the roadway.

After 35 minutes, the parking area, 100 feet long by 50 feet wide, was cleared with all snow stockpiled behind parking bumpers along either side of the parking lot. The operation was performed easily with little strain on the operator, and the areas where the snow had been packed down by cars driving over it in the roadway area were easily cut using the grading moldboard 46 with moderate downward pressure by the operator at the handlebar. Also, operator downward hand pressure near the end of the initial windrowing operation was not unmanageable for the operator even though the windrows were compiled and carried six passes each.

Example 3

An embodiment of the present invention comprising the dual engine type as shown in FIGS. 3a-3c was tested in conditions mimicking those typically found in the mountains in New Mexico. The dual engine embodiment cut a fire line in a forest firefighting situation. Flammable plant materials, degraded pine needles, leaves, and branches, were removed in a linear path, and the flammable materials were windrowed on the advancing fire side of the line. The majority of this work was performed using rear grading moldboard 46 with the dual engine embodiment in the walk behind position. Front bucket 12 was then used to cut more difficult dense growth areas with the dual engine embodiment in the mounted position.

Rear grading moldboard 46 initially cut the fire line while in the locked vertical angle position, where vertical angle turnbuckle 215 held the rear moldboard blade locked at a desired angle to the ground relative to axles 79 and 79'. Turnbuckle 215 was adjusted to force the leading edge down thereby causing a deeper cut at that end, the following edge of the blade was swiveled up and about the end of the drawbar extension, and less cut resulted at the following edge of the blade. The reverse occurred when the turnbuckle was adjusted alternately.

After the first pass down the fire line, several areas were passed over where grass had not been removed along the following edge of grading moldboard 46. The leading edge of the blade gouged out more material than necessary on the opposite side of this first pass in some places, or the opposite of this occurred in other areas. To remedy this effect the blade was set to float, or to follow the contours of the ground, and took an even amount of cut along the entire blade length. The vertical angle turnbuckle 215 was disconnected from the blade vertical adjustment 54, which allowed the vertical angle adjustment shaft 55 to rotate freely up and down while the blade was locked in the horizontal direction relative to the ground. The floating blade setting was effective when fire lines were cut, when clearing and grubbing operations were performed, and when a grading path was uniformly shaved and windrowed, along sloping and rolling terrain. A nearly perfectly clean cut across the entire surface that was passed over resulted, with only grass roots left behind. Grass roots left behind is an additional benefit, allowing much faster reestablishment of cover where the fire line was cut, and diminished erosion along the fire lines.

This machine gave a much truer float than a hydraulic grading machine did because the fluid in hydraulic cylinders did not displace quickly enough even though it was allowed to freely flow in both directions. The greater the ground speed the less reactive the hydraulically controlled blade set in the float position became to ground contour, and caused uneven cutting and gouging to continually increase when speed increased. The embodiment of the present invention tested in float mode reacted the same at maximum or minimum speeds and gave a nearly perfect float, with the only variable downward pressure due to the operator's downward pressure at the handlebar, which adjusted the desired amount of cut, which was evenly distributed across the entire length of the blade.

After the embodiment of the present invention was operated for approximately one hour and 15 minutes, a clean fire line approximately 1000 feet long and 7.5 feet wide resulted. The first pass was 3 feet wide, the second pass cut a new two-feet wide path, and carried over the windrow from the first pass, overlapped the first pass by one foot and reduced spillage to a minimum of the windrow around the leading edge on the rear moldboard blade. The subsequent third and fourth passes were further reduced to 1.5 feet in width. One foot of new path was cut and the overlap of the previous pass was increased relative to a three-foot total pass width for each pass. Two more passes over the entire line were made, and all dribble or uncut areas starting at the centerline of the first pass were cleaned, and ended at the windrow on the opposite side of the fire line.

The fire line was doubled in width to fifteen feet wide when the pass was started at the edge of the first cut that was made, and the windrowed material flowed in the opposite direction of the flow made via the first cut. All subsequent operations followed the steps outlined previously, and all windrowing occurred toward the opposite side of the fire line of the original passes. A thousand-foot long by fifteen-foot wide fire line was created with windrowed material piled along either side of the line in approximately 2½ hours. A wider fire line is useful in high wind conditions because it is more difficult for the fire to jump the wider line with blown embers.

All of the steps performed during the fire line cutting procedure were the same as the preliminary steps performed in a trail building procedure. All of the steps that follow this procedure were carried out in Example 1, as described previously. The minimum trail width that was built was three feet wide, which is a narrower width than any other available machine on the market, and was an optimum width for walking or bicycling. The present invention is much faster and more efficient than other machines known in the art and resulted in an improved end product.

Example 4

Another embodiment of the present invention excavated where an excess of material was located on the site being graded and a portion of the excavated material was exported off the site. The embodiment used in this test comprises the embodiment illustrated in FIGS. 2a-2e. The base weight of the embodiment used was approximately 310 pounds. Approximately 160 pounds of water was placed in the counterweight tanks and a 220 pound operator performed the test. Thus, the operating weight was 690 pounds with a 200 pound bucket payload. The embodiment used in this test comprised rippers 72 and 72' as illustrated in FIG. 1d.

A house pad site that included a small crawl space area that had excavated dimensions of 10 feet×15 feet×4 feet deep was constructed. The pad site was located in an area with silted sand soil from the existing ground level down to the bottom of the crawl space level. A pickup truck with a dump trailer and a walk-behind plate compactor were also used as additional equipment.

The site was cleared and grubbed of all deleterious grass materials. The existing ground was scraped (or cut) with bucket 148 and the scraped material was placed in the dump trailer, which was then removed off site. The crawl space was then excavated including a ten feet long by four feet wide ramp on one of the ten feet wide sides. Most of the excavated material was hauled off in the dump trailer. The crawl space was excavated by loosening material in three-inch layers with rippers 72 and 72' in the 10 feet×15 feet area and ramp, then material was excavated with bucket 148. A total of fifteen successive layers were dug with a total of approximately twenty-five cubic yards of material excavated in the crawl space area during a period of approximately 6 hours.

Rippers 72 and 72' were used to rip the rest of the 2000 square foot pad three inches deep. The area was graded to the appropriate elevation using bucket 148. The entire area was then compacted using the plate compactor which was the final preparation step. Concrete was then poured. The entire operation not including compaction was accomplished in approximately 7.5 hours. Approximately 3½ gallons of gasoline was used during the test.

The preceding examples can be repeated with similar success by substituting generically or specifically described operating conditions of this invention for those used in the preceding examples.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention. It is contemplated that the use of the present invention can involve components having different characteristics as long as the principle is followed.

I claim:

1. An apparatus comprising:
    a drawbar (70);
    a bucket body (12) fixedly connected to said drawbar (70), wherein said bucket body (12) is open on one side for receiving material, further wherein a lower edge of said bucket body (12), at said one open side, is in the form of a cutting blade (78) or teeth, further wherein a side of said bucket body (12) opposite the one open side is provided with a gate (61) that is configured to be opened or closed to release material from, or retain material in, said bucket body;
    an operator platform formed by at least a part of a top side of said bucket body (12), said operator platform configured to receive feet of an operator and to support the operator positioned in a standing position thereon;
    wheels or endless tracks attached to said drawbar (70) and disposed on opposite sides of said bucket body (12) between said one open side and said gate (61) of said bucket body;
    at least one engine (14; 202, 203) disposed on said drawbar (70) or said bucket body (12) and drivingly connected to said wheels; and
    a handlebar (64) non-pivotably connected to said bucket body (12), forward of said operator platform (77), for pivoting said bucket body (12) about said wheels such that said cutting blade (78) or teeth can be brought into or out of contact with a surface to be worked upon, said cutting blade (78) or teeth being brought into contact with said surface with application of a downward force on said cutting blade (78) or teeth, wherein said downward force applied on the cutting blade (78) or teeth is applied both by a proportionate machine weight applied by tilting the bucket body forward to bring the cutting blade (78) or teeth into contact with the surface and a weight of the operator, wherein the weight of the operator is applied to the wheels or endless tracks for increased traction, and proportionately to the cutting blade (78) or teeth, depending upon where on the operator platform the feet of the operator are placed and how the weight of the operator is distributed on the feet of the operator.

2. An apparatus according to claim 1, wherein two wheels are attached to said drawbar (70).

3. An apparatus according to claim 1, wherein two engines are provided, each of which is respectively drivingly connected with the wheel, wheels, or endless track on one of the opposite sides of said bucket body (12).

4. An apparatus according to claim 1, which further comprises pivotable ripper means (72) disposed on an underside of said bucket body (12) opposite said top side and between said one open side and said gate (61) of said bucket body.

5. An apparatus according to claim 1, which further comprises at least one ground engagement attachment (46) removably disposed on said drawbar (70) or said bucket body (12) and configured to be brought into and out of engagement with the surface.

6. An apparatus according to claim 5, wherein said at least one ground engagement attachment (46) is selected from the group consisting of a grading moldboard, a snow plow, a plow and a disc.

7. An apparatus according to claim 6, wherein said at least one ground engagement attachment is a grading moldboard (46) disposed on said drawbar (70) remote from said one open side of said bucket body (12), and wherein said grading moldboard (46) is pivotable in planes that range from substantially parallel to the surface to substantially perpendicular to the surface.

8. An apparatus according to claim 7, wherein said grading moldboard (46) comprises a composite torsional beam skeleton having at least three thin-walled tubing sections defining moldboard upper, lower, and center torsional members, all held in position by at least three vertical support members and being reinforced on opposite ends by at least one diagonal support strut, and wherein said grading moldboard is provided with a cutting edge disposed along one side, adjoined by gage sheet metal shaped into a curve in one axis.

9. An apparatus according to claim 1, further comprising at least one counterweight (56, 56') disposed on at least one of said bucket body (12) and said drawbar (70).

10. A method of operating the apparatus of claim 1, including the steps of:
    shifting the weight of said apparatus and the weight of an operator positioned on the operator platform to pivot said bucket body about said wheels to bring said cutting blade (78) or teeth into or out of contact with the surface; and
    driving said apparatus, with said at least one engine, to enable said cutting blade (78) or teeth of said bucket body (12) to cut into the surface and said bucket body to receive material when said cutting blade or teeth are in contact with the surface.

11. A method according to claim 10 which includes the step of opening said gate (61) to release material from said bucket body (12) when said cutting blade (78) or teeth are out of contact with the surface.

12. A method according to claim 10, which includes disposing a pivotable ripper means (72) on an underside of said bucket body (12), pivoting said ripper means (72) into a down position, shifting the weight of said apparatus about said wheels to bring said ripper means (72) into contact with the surface, and driving said apparatus with said at least one engine to enable said ripper means (72) to interact with the surface.

13. A method of operating the apparatus of claim 5, including the steps of:
   shifting the weight of said apparatus about said wheels to bring said cutting blade (78) or teeth out of contact with the surface;
   lowering said ground engagement attachment (46) into contact with the surface; and
   driving said apparatus with said at least one engine to enable said ground engagement attachment (46) to move material of said surface.

14. An apparatus comprising:
   a drawbar (70);
   a bucket body (12) fixedly connected to said drawbar (70), wherein said bucket body (12) is open on one side for receiving material, further wherein a lower edge of said bucket body (12), at said one open side, is in the form of a cutting blade (78) or teeth, further wherein a side of said bucket body (12) opposite the one open side is provided with a gate (61) that is configured to be opened or closed to release material from, or retain material in, said bucket body;
   an operator platform formed by at least a part of a top side of said bucket body (12), said operator platform configured to receive feet of an operator and to support the operator positioned in a standing position thereon;
   wheels or endless tracks attached to said drawbar (70) and disposed on opposite sides of said bucket body (12) between said one open side and said gate (61) of said bucket body;
   at least one engine (14; 202, 203) disposed on said drawbar (70) or said bucket body (12) and drivingly connected to said wheels; and
   a handlebar (64) non-pivotably connected to said bucket body (12), forward of said platform (77), for pivoting said bucket body (12) about said wheels such that said cutting blade (78) or teeth can be brought into or out of contact with a surface to be worked upon, wherein said cutting blade (78) or teeth are brought into contact with the surface with application of a downward force on said cutting blade (78) or teeth, wherein said downward force applied on the cutting blade (78) or teeth is applied both by a proportionate machine weight applied by tilting the bucket body forward to bring the cutting blade (78) or teeth into contact with the ground and a weight of the operator, wherein said weight of the operator is variable depending on positioning of feet of the operator on said operator platform;
   at least one ground engagement attachment (46) removably disposed on said drawbar (70) or said bucket body (12) and configured to be brought into and out of engagement with the surface, wherein said at least one ground engagement attachment is a grading moldboard (46) disposed on said drawbar (70) remote from said one open side of said bucket body (12), and wherein said grading moldboard (46) is pivotable in planes that range from substantially parallel to the surface to substantially perpendicular to the surface,
   wherein said grading moldboard (46) comprises a composite torsional beam skeleton having at least three thin-walled tubing sections defining moldboard upper, lower, and center torsional members, all held in position by at least three vertical support members and being reinforced on opposite ends by at least one diagonal support strut, and wherein said grading moldboard is provided with a cutting edge disposed along one side, adjoined by gage sheet metal shaped into a curve in one axis.

* * * * *